US008388431B2

(12) United States Patent
Kato

(10) Patent No.: US 8,388,431 B2
(45) Date of Patent: Mar. 5, 2013

(54) GAMING MACHINE AND GAME CONTROL METHOD THEREOF, IN WHICH COMMON GAME USES SYMBOL COLUMNS DIFFERENT FROM THOSE USED IN UNIT GAME

(75) Inventor: Yoichi Kato, Tokyo (JP)

(73) Assignees: Universal Entertainment Corporation, Tokyo (JP); Aruze Gaming America, Inc., Las Vegas, NV (US)

(*) Notice: Subject to any disclaimer, the term of this patent is extended or adjusted under 35 U.S.C. 154(b) by 229 days.

(21) Appl. No.: 12/894,802

(22) Filed: Sep. 30, 2010

(65) Prior Publication Data

US 2011/0092269 A1 Apr. 21, 2011

(30) Foreign Application Priority Data

Oct. 21, 2009 (JP) ................................ 2009-242596

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .......................................... 463/18; 438/20

(58) Field of Classification Search .................... 463/18, 463/20

See application file for complete search history.

(56) References Cited

U.S. PATENT DOCUMENTS

| | | | |
|---|---|---|---|
| 4,283,709 | A | 8/1981 | Lucero et al. |
| 5,820,459 | A | 10/1998 | Acres et al. |
| 6,003,013 | A | 12/1999 | Boushy et al. |
| 6,142,872 | A | 11/2000 | Walker et al. |
| 6,312,332 | B1 | 11/2001 | Walker et al. |
| 6,361,441 | B1 | 3/2002 | Walker et al. |
| 6,733,390 | B2 | 5/2004 | Walker et al. |
| 2002/0042296 | A1 | 4/2002 | Walker et al. |

FOREIGN PATENT DOCUMENTS

WO WO2009/052164 A1 * 4/2009

* cited by examiner

*Primary Examiner* — William M. Brewster

(74) *Attorney, Agent, or Firm* — Edwards Wildman Palmer LLP

(57) ABSTRACT

A gaming machine of the present invention includes slot machines each of which repeatably runs, independently of the other slot machines, a unit game which scroll displays a base game symbol column image and stops the scroll-display to rearrange base game symbols. In response to a common game start command from a center controller, each slot machine runs, in sync with other slot machines, a common game which executes a common scrolling process in which a common game symbol column image which is different from the base game symbol column image is scroll displayed, and then stopped to rearrange common game symbols.

3 Claims, 22 Drawing Sheets

300
400
WIN
$1234.56
301c(301)
301b(301)
301a(301)
303b (303)
303a (303)
302a (302)
302b (302)
302c (302)
10a (10)
10b (10)
10c (10)
THIRD TIME
SECOND TIME
FIRST TIME
A NUMBER OF LIGHT EMITTING PORTIONS CORRESPONDING TO THE NUMBER OF POINTS OBTAINED ARE NEWLY ACTIVATED
× 3 = 300 pt.
× 1 = -100 pt.
200 pt.
16
301
Progressive Jackpot
$1234. 56
Congratulations!

FIG. 14

| | REEL151 | REEL152 | REEL153 | REEL154 | REEL155 |
|---|---|---|---|---|---|
| CODE NO. | SYMBOL | SYMBOL | SYMBOL | SYMBOL | SYMBOL |
| 00 | ANGELFISH | TUNA | TUNA | COELACANTH | CLOWNFISH |
| 01 | CLOWNFISH | COELACANTH | TUNA | ANGELFISH | TUNA |
| 02 | ANGELFISH | TUNA | ANGELFISH | CLOWNFISH | ANGELFISH |
| 03 | CLOWNFISH | COELACANTH | TUNA | TRIGGER | COELACANTH |
| 04 | ANGELFISH | TUNA | ANGELFISH | COELACANTH | CLOWNFISH |
| 05 | WILD | ANGELFISH | WILD | CLOWNFISH | 7 |
| 06 | ANGELFISH | CLOWNFISH | ANGELFISH | TUNA | ANGELFISH |
| 07 | CLOWNFISH | TUNA | CLOWNFISH | 7 | TUNA |
| 08 | 7 | WILD | ANGELFISH | CLOWNFISH | CLOWNFISH |
| 09 | TUNA | TUNA | CLOWNFISH | ANGELFISH | WILD |
| 10 | ANGELFISH | COELACANTH | ANGELFISH | COELACANTH | TUNA |
| 11 | COELACANTH | TRIGGER | CLOWNFISH | ANGELFISH | CLOWNFISH |
| 12 | ANGELFISH | CLOWNFISH | COELACANTH | CLOWNFISH | COELACANTH |
| 13 | TRIGGER | 7 | TRIGGER | TUNA | ANGELFISH |
| 14 | 7 | COELACANTH | 7 | TUNA | TUNA |
| 15 | ANGELFISH | TUNA | COELACANTH | TRIGGER | CLOWNFISH |
| 16 | TUNA | COELACANTH | TUNA | TUNA | TUNA |
| 17 | CLOWNFISH | BONUS | CLOWNFISH | COELACANTH | ANGELFISH |
| 18 | ANGELFISH | CLOWNFISH | ANGELFISH | CLOWNFISH | COELACANTH |
| 19 | CLOWNFISH | TUNA | CLOWNFISH | ANGELFISH | ANGELFISH |
| 20 | 7 | COELACANTH | ANGELFISH | TUNA | CLOWNFISH |
| 21 | TUNA | TUNA | CLOWNFISH | CLOWNFISH | TRIGGER |

FIG. 15

| | REEL |
|---|---|
| CODE NO. | SYMBOL |
| 00 | BETTLE ROYAL |
| 01 | BLANK |
| 02 | SKULL |
| 03 | BLANK |
| 04 | BETTLE ROYAL |
| 05 | BETTLE ROYAL |
| 06 | BLANK |
| 07 | BLANK |
| 08 | BETTLE ROYAL |
| 09 | BLANK |
| 10 | SKULL |
| 11 | SKULL |
| 12 | BLANK |
| 13 | BETTLE ROYAL |
| 14 | SKULL |
| 15 | BETTLE ROYAL |
| 16 | BLANK |
| 17 | SKULL |
| 18 | BLANK |
| 19 | BLANK |
| 20 | BETTLE ROYAL |
| 21 | SKULL |

FIG. 16

COMMON GAME SYMBOL VALUE TABLE

| COMMON GAME SYMBOL | POINTS |
|---|---|
| BATTLE ROYAL SYMBOL | 100 |
| SKULL SYMBOL | −100 |
| BLANK SYMBOL | 0 |

FIG. 17

TERMINAL INFORMATION TABLE

| TERMINAL | POINTS |
|---|---|
| 10a | 500 |
| 10b | 0 |
| 10c | 700 |
| 10d | 200 |
| ··· | ··· |

GAMING MACHINE AND GAME CONTROL METHOD THEREOF, IN WHICH COMMON GAME USES SYMBOL COLUMNS DIFFERENT FROM THOSE USED IN UNIT GAME

CROSS REFERENCE TO RELATED APPLICATION

The present application claims priority from Japanese Patent Application No. 2009-242596, which was filed on Oct. 21, 2009, the disclosure of which is herein incorporated by reference in its entirety.

BACKGROUND OF THE INVENTION

1. Field of the Invention

The present invention relates to a gaming machine and a game control method thereof, in which a common game uses symbol columns different from those used in a unit game.

2. Description of Related Art

Among existing gaming machines, there is a gaming machine including: two or more gaming terminals; terminal controllers respectively provided to the gaming terminal, each of which controllers causes associated one of the gaming terminals to run a game; a center controller for controlling all the terminal controllers. These known gaming machines are disclosed in, for example, U.S. Patent Application No. 2002/0042296, U.S. Pat. No. 6,733,390, U.S. Pat. No. 6,312,332, U.S. Pat. No. 6,142,872, U.S. Pat. No. 6,361,441, U.S. Pat. No. 5,820,459, U.S. Pat. No. 4,283,709, and U.S. Pat. No. 6,003,013.

A terminal controller of a gaming terminal runs a game and awards a payout based on the result of the game independently from another terminal controller of another gaming terminal. The center controller provides a common game, in which two or more players compete against one another for various jackpots, such as a progressive jackpot and a mystery jackpot, through the gaming terminals. Thus, how to run a common game at each gaming terminal has traditionally been an important element of improving the entertainment characteristic in the gaming machine having the plurality of gaming terminals.

The object of the present invention is to provide a gaming machine having a function of running a common game capable of realizing a high entertainment characteristic, and a control method of the gaming machine.

SUMMARY OF THE INVENTION

A gaming machine of the present invention: a plurality of gaming terminals each having a display which arranges thereon a plurality of symbols, a symbol column image storage which stores a plurality of symbol column images having the plurality of symbols, and a terminal controller programmed to perform the following steps of (a1) and (a2); and a center controller which is connected and in communication with the gaming terminals and which is programmed to execute the following process of (b1).

Each terminal controller executes the steps of:

(a1) repeatably running, independently of the other gaming terminals, a unit game which scrolls the symbol column images and stops the scrolling to rearrange a plurality of symbols; and (a2) repetitively running, in sync with the other gaming terminals, a common game which performs a common scrolling process in which a symbol column image different from that used in the unit game is scrolled and stopped to rearrange a plurality of symbols, in response to a common game start command from the center controller, The center controller executes the steps of:

(b1) outputting the common game start command to the terminal controller, based on the state of (a1) being executed by the terminal controller.

With the structure, the unit game and the common game scroll different symbol column images, and rearranges a plurality of symbols thereafter. Thus, while the unit game and the common game are similar to each other and symbols are rearranged in the both games, the use of different symbol column images enables distinguishing of the both games from each other. As a result, while a player is able to know which game is currently running, the player is also able to easily understand the both the unit game and the common game. Thus, the gaming machine is provided with a function of a common game that achieves a high entertainment characteristic.

The gaming machine of the present invention further includes: a terminal information memory which stores information output from any of the gaming terminals to the center controller, in association with identification information for identifying that gaming terminal; and a common game symbol value storage which stores, in association with weighting values, only a plurality of common game symbols in the symbol column image displayed in the common game.

The terminal controller determines a payout of each unit game according to an arrangement of the plurality of symbols rearranged in (a1), and further executes the steps of:

(a3) calculating points for each common scrolling process, based on the weighting value corresponding to the common game symbols rearranged in (a2);

(a4) outputting to the center controller the identification information and the points of each of the common scrolling processes.

The center controller executes the steps of:

(b2) accumulatively storing in the terminal information memory, the points from the terminal controller in association with the identification information; and (b3) determining a payout for the gaming terminal, according to the points accumulatively stored in the terminal information memory, at a predetermined timing.

With the structure, while a payout is determined for each unit game, a payout is determined for each gaming terminal in the common game, according to the accumulated points calculated for each of the common scrolling processes based on the common game symbols rearranged. Thus, a payout of the common game is determined for each gaming terminal, according to the points won by a player playing on that gaming terminal. This allows improvement of the player's feeling of accomplishment, when the player receives the payout of the common game. As the result, the gaming machine can provide a further improved entertainment characteristic.

The present invention is the gaming machine further comprising an input terminal that allows an external input, wherein the terminal controller modifies a display mode of the common game symbols, based on an input to the input terminal.

With the structure, the display mode of the common game symbols in the common game is externally modifiable. Therefore, the entertainment characteristic is further improved.

In order to achieve the object, the present invention is a game control method of a gaming machine including: a plurality of gaming terminals each having a display that arranges a plurality of symbols, a symbol column image storage that stores a plurality of symbol column images having the plurality of symbols, and a terminal controller programmed to perform the following steps; and a center controller connected and in communication with the gaming terminals programmed to execute the following steps.

That is, the terminal controller executes the steps of: repeatably running the unit game independently of the other gaming terminals, the unit game being a game in which the symbol column image scroll displayed is stopped to rearrange the plurality of symbols; and in response to a common game start command from the center controller, running a common game which executes in sync with the other gaming terminals a common scrolling process in which symbol column image different from that of the unit game is scroll displayed and stopped to rearrange the plurality of symbols.

The center controller executes the step of outputting the common game start command to the terminal controller based on the state of the unit game run by the terminal controller.

With the structure, the unit game and the common game scroll different symbol column images, and rearranges a plurality of symbols thereafter. Thus, while the unit game and the common game are similar to each other and symbols are rearranged in the both games, the use of different symbol column images enables distinguishing of the both games from each other. As a result, while a player is able to know which game is currently running, the player is also able to easily understand the both the unit game and the common game. Thus, the gaming machine is provided with a function of a common game that achieves a high entertainment characteristic.

The present invention can include a function of the common game capable of realizing a high entertainment characteristic.

BRIEF DESCRIPTION OF THE DRAWINGS

FIG. 14 is an explanatory diagram of a base game symbol data table.

FIG. 15 is an explanatory diagram of a common game symbol table.

FIG. 16 is an explanatory diagram of a common game symbol value table.

FIG. 17 is an explanatory diagram showing a terminal information table.

DESCRIPTION OF THE PREFERRED EMBODIMENTS

The following will describe an embodiment of the present invention with reference to the figures.

(Gaming Machine Overview)

A gaming machine includes a plurality of gaming terminals and a center controller data-communicably connected to the gaming terminals. Each gaming terminal runs independently of the other gaming terminals a unit game using symbol columns, and runs a common game in sync with the other gaming terminals using symbol columns different from those used in the unit game.

Figure 1:
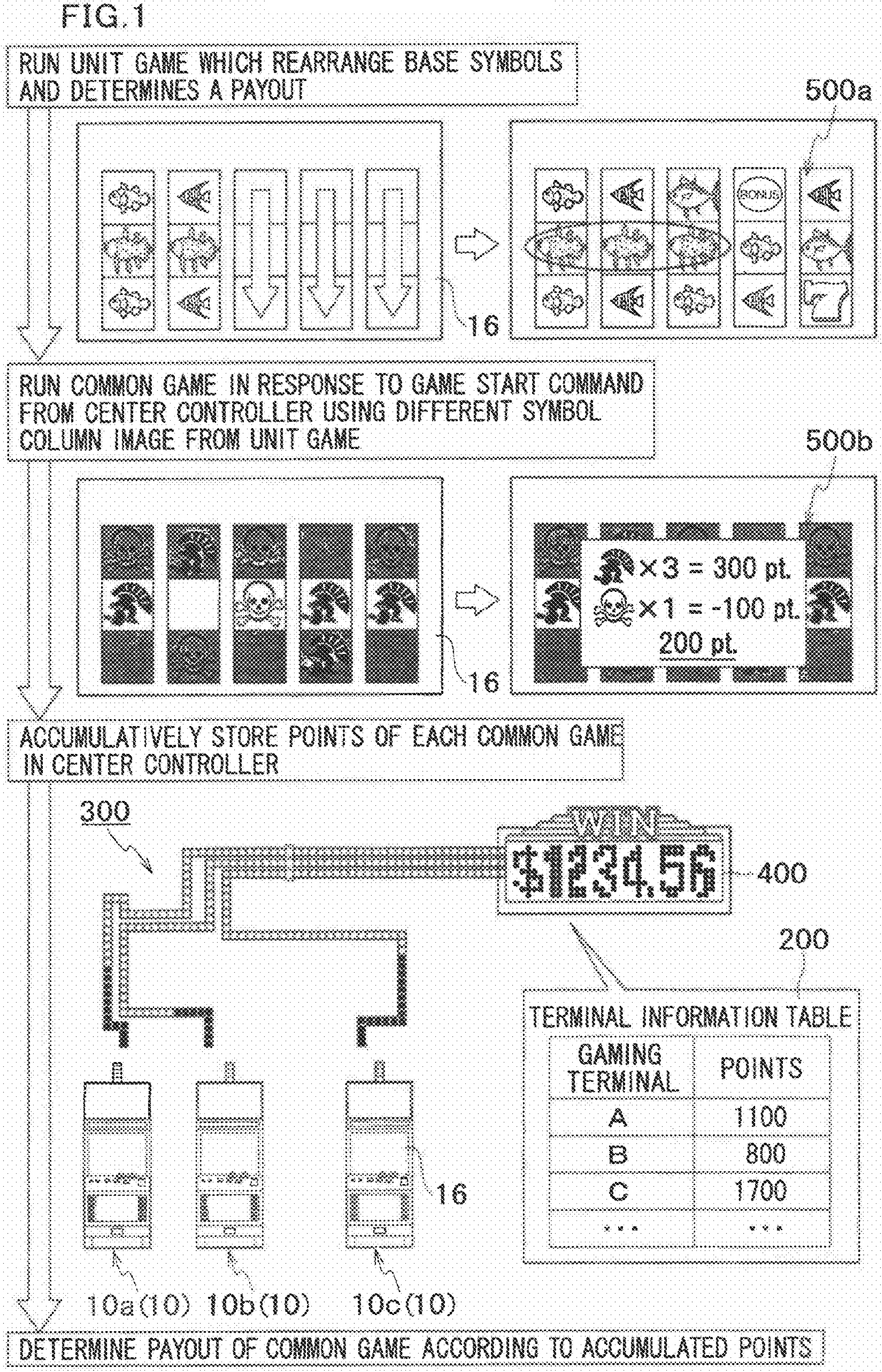
FIG. 1 is an explanatory diagram illustrating a game control method of a gaming machine.
Figure 2:
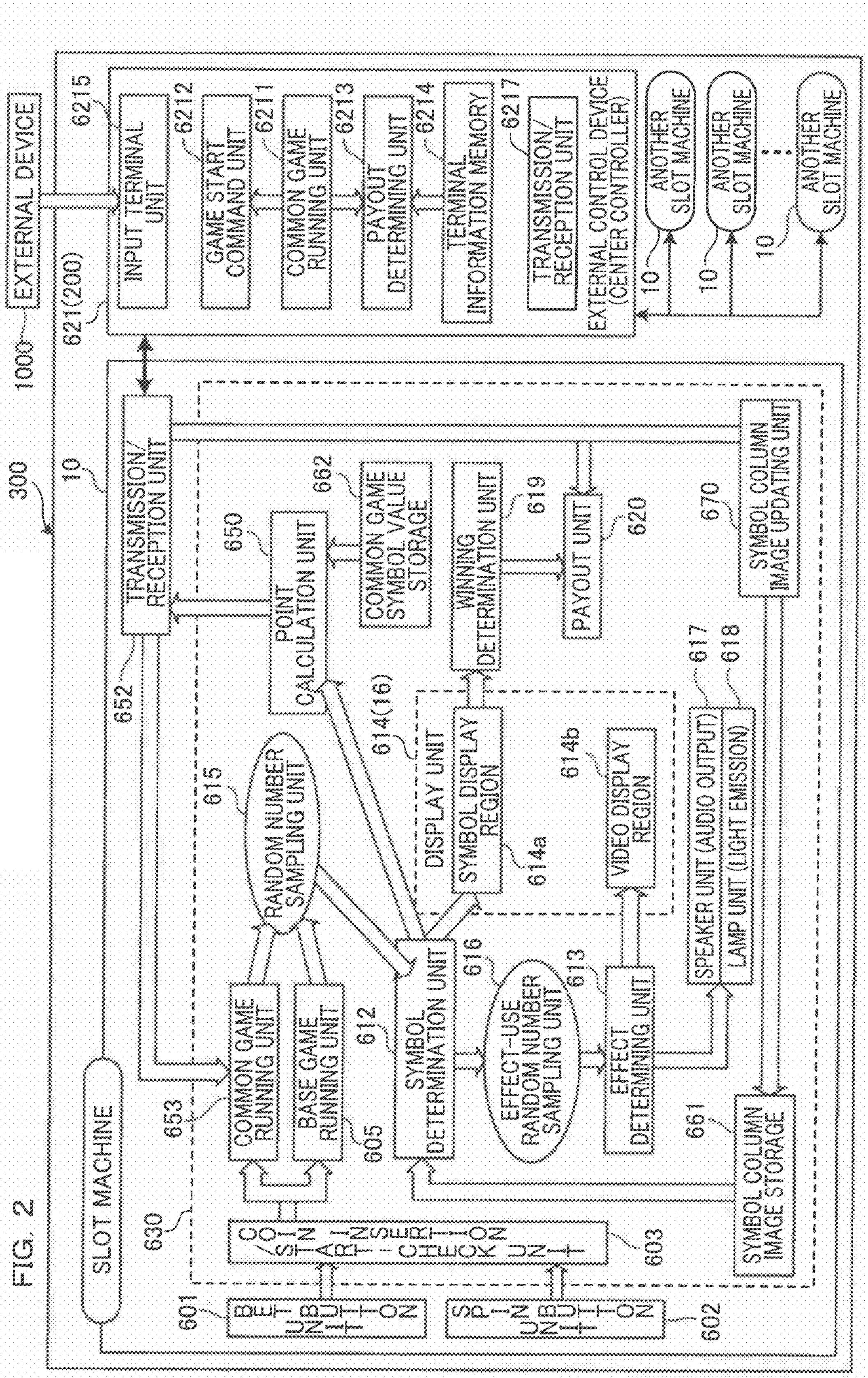
FIG. 2 is a block diagram of the gaming machine.
Figure 3:
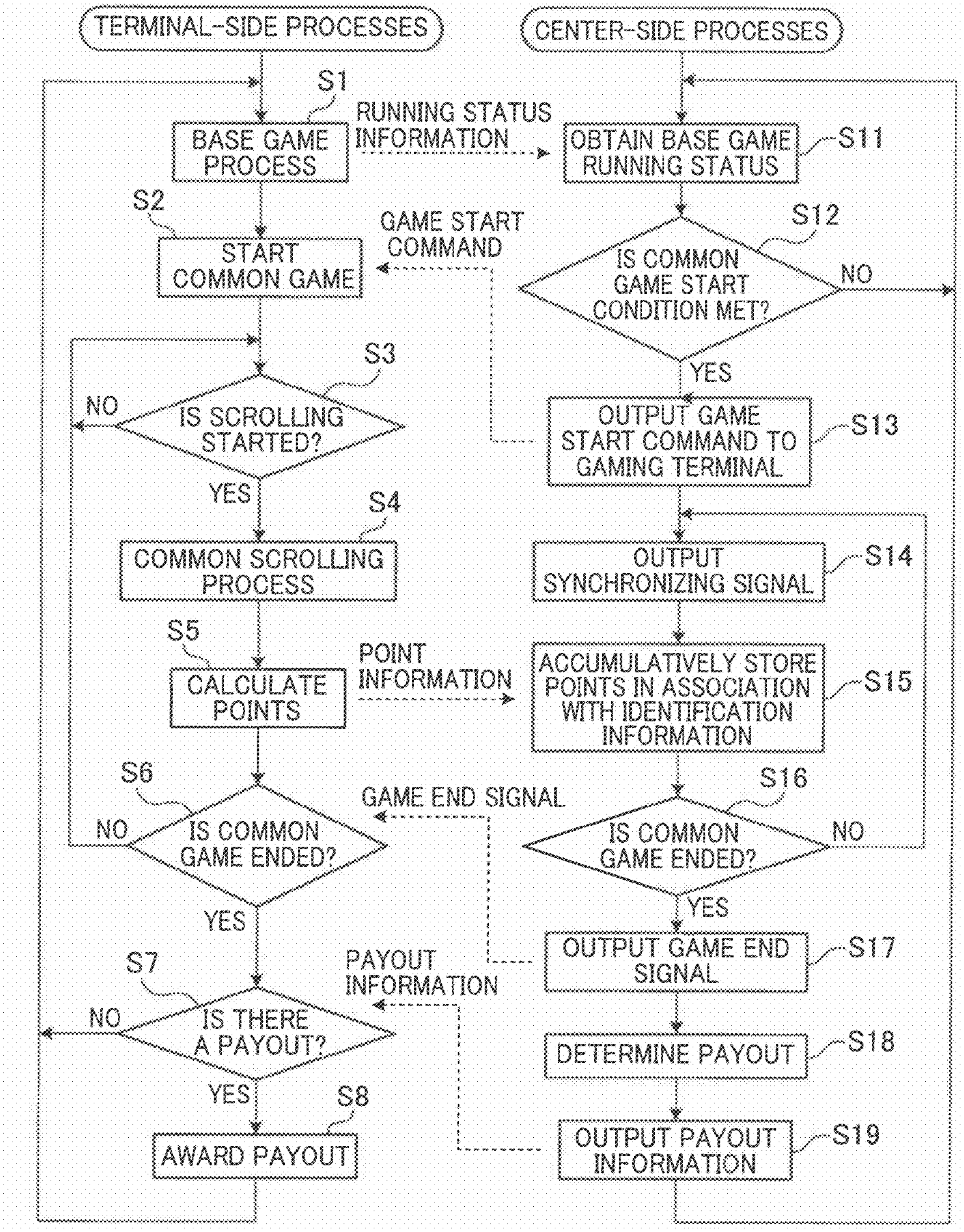
FIG. 3 is a flowchart illustrating the playing method of the gaming machine.

Specifically, as shown in FIG. 1 to FIG. 3, a gaming machine 300 is a multiplayer-type gaming machine in which a plurality of slot machines 10 each serving as a gaming terminal is data-communicably connected to the center controller 200. The gaming machine 300 is structured so that each slot machine 10 is able to individually run a unit game such as a slot game, independently of the other slot machines 10. In the unit game, a symbol column image 500 is scroll displayed on a lower image display panel 16 (display unit 614) serving as a display and is stopped to rearrange a plurality of symbols 501. Note that in the present embodiment, the symbol column image 500 is also referred to as a reel video 500.

Further, the gaming machine 300 has a first structure which causes the slot machine 10*a* to run in sync with the one another a slot game a plurality of number of times as a common game.

Note that the connection between the slot machines 10 and the center controller 200 may be wireless, wired, or a combination of these. Note that a unit of the bet amount may be a national or regional currency such as dollar, yen, and Euro. The unit of the bet amount may also be a game point used only at a hall where the gaming machine 300 is provided, or in the related industry.

More specifically, the first structure is as follows: the gaming machine 300 includes a plurality of slot machines 10 each including the lower image display panel 16 (display unit 614) for arranging thereon the plurality of symbols 501, a symbol column image storage 661 which stores a plurality of symbol column images 500 each having the plurality of symbols 501, and a terminal controller 630 programmed to execute the following steps of (a1) and (a2); and a center controller 200 which is connected in communication with the slot machines 10 and is programmed to execute the following process of (b1).

The terminal controller 630 of each slot machines 10 executes the following steps of (a1) and (a2). Step (a1) is a step of repeatably running, independently of the other slot machines 10, a unit game which scrolls the symbol column image and stops the scrolling to rearrange a plurality of symbols 501 on the lower image display panel 16. Step (a2) is a step of repeatably running, in sync with the other slot machines 10, a common game which performs a common scrolling process in which the symbol column image different from that of the unit game are scrolled and stopped to rearrange a plurality of symbols 501, in response to a common game start command from the center controller 200.

The center controller 200 of the gaming machine 300 executes the step of (b1). Step (b1) is a step of outputting a common game start command to the terminal controller 630, based on the state of (a1) executed by the terminal controller 630.

The expression "rearrange" means dismissing an arrangement of symbols 501, and once again arranging symbols 501. An "arrangement" in this specification means a state of symbols 501, which can be visually confirmed by a player.

Note that a unit game includes a series of operations performed within a period between a start of receiving a bet to a point where a winning may be resulted. In the present embodiment, a unit game is repeatable in the regular game, and contains one each of the following: a bet time where a bet is accepted; a game time where symbols 501 having been stopped are rearranged; and a payout time where a payout process is performed to award a payout. Note that the "regular game" is a game runnable on condition that a game value is bet, which regular game awards an amount of game media based on symbols 501 rearranged. In other words, the "regular game" is a unit game which starts on the premise that a game value is consumed. The "unit game" in the present embodiment is so-called slot game which is run in each slot machine 10 independently of the other slot machines 10.

Note that the gaming machine 300 of the present embodiment is structured so that each slot machine 10 is able to run a bonus game independently of the other slot machines 10. The "bonus game" has a same meaning as a "feature game". In the present embodiment, the bonus game is a game in which a free game is repeated. However, the bonus game is not particularly limited and may be any type of game, provided that the bonus game is more advantageous than the regular game for a player. Another bonus game may be adopted in combination, provided that the player is given a more advantageous playing conditions than the regular game. For example, the bonus game may be a game that provides a player with a chance of winning more game values than the regular game or a game that provides a player with a higher chance of winning game values than the regular game. Alternatively, the bonus game may be a game that consumes fewer amounts of game values than the regular game. In the bonus game, these games may be provided alone or in combination.

A game runnable with a bet of less game values than the regular game is referred to as "free game". Note that "bet of fewer amounts of game values" encompasses a bet of zero game value. The "free game" therefore may be a game runnable without a bet of game value, which awards an amount of game values according to symbols 501 having been rearranged. In other words, the "free game" may be a game which is started without the premise that a game value is consumed. To the contrary, a later-mentioned "regular game" is a game runnable on condition that a game value is bet, which awards an amount of game values according to symbols 501 rearranged. In other words, the "regular game" is a game which starts on the premise that a game value is consumed.

That is, the gaming machine 300 of the present embodiment has a state in which the regular game or the bonus game is runnable, and a state in which the common game is runnable. The regular game and/or the bonus game are also referred to as base game. Thus, in the present embodiment, the base game includes a regular game and a bonus game. Further, the common game or the period during which the common game is run is referred to as "event time".

The "game value" is a coin, bill, or electrically valuable information corresponding to these. Note that the game value in the present invention is not particularly limited. Examples of the game value include game media such as medals, tokens, cyber money, tickets, and the like. Further, the ticket is not particularly limited and may be a later-described ticket with a barcode or the like ticket.

The "common scrolling process" is a process in which the game time occurs in the slot machines 10 in sync with one another. Further, the "common scrolling process" is a process in which, during the game time, a symbol column image different from that used in the "unit game" is scrolled and a plurality of symbols 501 are rearranged thereafter.

The "state of (a1)" mentioned in step (b1) means the state of the unit game run by the plurality of slot machines 10. That is, when the state of the unit game run in the plurality of the slot machines 10 satisfies a predetermined condition, a common game start command is output to the slot machine 10. For example, the "the state of the unit game" encompasses: an amount of bet placed in the unit game, the symbols 501 rearranged in the unit game, formation of a winning combination as a result of rearrangement, the number of times the unit game is repeated, or the like. The predetermined condition can be any of the following conditions: the amount of bet value accumulated in the repeated unit games surpasses a predetermined amount; the symbols 501 rearranged in the unit game includes a predetermined symbol; the symbols 501 rearranged forms a predetermined combination; the unit game is repeated more than a predetermined number of times; or the like conditions. In the present embodiment, the terminal controller 630 outputs the running status information as the state of the process to the center controller 200.

Further, the center controller 200 may output the common game start command to all the slot machines 10 data-communicably connected to the center controller 200, or to those slot machines 10 having satisfied a predetermined condition.

Note that the present embodiment deals with the gaming machine 300 having a center controller 200 aside from the slot machines 10; however, the present invention is not limited to this. In other words, the gaming machine 300 may be configured in such a manner that at least one slot machine 10 has a function of the center controller 200, and the slot machines 10 may be data-communicably connected to each other.

The gaming machine 300 having the first structure as described above realizes a gaming method which data-communicably connected connects the plurality of slot machines 10 to the center controller 200; runs, in each slot machine 10 independently of the other slot machines 10, a unit game that uses the symbol column image 500; and runs, in sync with the other slot machines 10, a common game using a symbol column image 500 that is different from that used in the unit game. In other words, the gaming machine 300 is made operable at least by a control method which data-communicably connected connects the plurality of slot machines 10 to the center controller 200, runs, in each slot machine 10 independently of the other slot machine 10, a unit game that uses the symbol column image 500; and runs, in sync with the other slot machines 10, a common game using a symbol column image 500 that is different from that used in the unit game.

Specifically, the gaming method or the control method of the gaming machine 300 is executed in a gaming machine 300 including a plurality of slot machines 10 each having a lower image display panel 16 for arranging thereon a plurality of symbols 501, a symbol column image storage 661 which stores a plurality of symbol column images 500 having the plurality of symbols 501, a terminal controller 630 programmed to execute the steps described below; and a center controller 200 which is connected to and in communication with the slot machines 10 and is programmed to execute the steps described below.

The terminal controller 630 of the slot machine 10 executes a first step of repeatably running the unit game, independently of the other slot machines 10, in which the symbol column image 500 is scroll displayed and then stopped to rearrange a plurality of symbols 501; and a second step of running the common game, in sync with the other slot machines 10, which repeats a common scrolling process which scroll displays the symbol column image 500 different from that of the unit game and stops to rearrange a plurality of symbols 501, in response to a common game start command from the center controller 200.

The center controller 200 runs a third step of outputting a common game start command to the terminal controller, based on the state of (a1) being executed by the terminal controller 630.

As described, with the gaming machine 300 having the first structure, or the playing method or the control method having the above mentioned steps, different symbol column images 500 are scroll displayed and different pluralities of symbols 501 are rearranged in the unit game and the common game, respectively. Thus, while the unit game and the common game are similar to each other and symbols 501 are rearranged in the both games, the use of different symbol column images 500 enables distinguishing of the both games from each other. As a result, while a player is able to know which game is currently running, the player is also able to easily understand the both the unit game and the common game. Thus, the gaming machine 300 is provided with a function of a common game that achieves a high entertainment characteristic.

Further, the gaming machine 300 may further include, in addition to the first structure, the following structures and a second structure having the following steps of (a3), (a4), (b2), and (b3). Specifically, the second structure may further include: a terminal information memory 6214 which stores information to be output from the slot machine 10 to the center controller 200, in association with identification information for identifying the slot machine 10; and a common game symbol value storage 662 which stores in association with a weighting value a plurality of common game symbols 510 provided to only the symbol column image 500 displayed in the common game.

The terminal controller 630 may further execute the step of (a3) determining a payout for each unit game, according to the arrangement of the plurality of symbols 501 rearranged in (a1), and calculating the point for each common scrolling process, based on the respective weightings of the common game symbols 510 rearranged in (a2); and (a4) outputting the identification information and the points to the center controller 200 for each of the common scrolling processes.

The center controller 200 may further execute the steps of: (b2) accumulatively storing the points from the terminal controller 630 in the terminal information memory 6214, in association with the identification information; and (b3) determining a payout for the slot machine 10, according to the points accumulatively stored in the terminal information memory 6214, at a predetermined timing.

With the structure, while payout for the regular game is determined for each unit game, a payout is determined for each slot machine 10 in the common game, according to the accumulated points calculated based on the common game symbols 510 rearranged every time the common scrolling process is performed. Thus, a payout of the common game is determined for each slot machine 10, according to the points won by a player playing on that slot machine 10. This allows improvement of the player's feeling of accomplishment, when the player receives the payout of the common game. As the result, the gaming machine 300 can provide a further improved entertainment characteristic.

Further, the gaming machine 300, in addition to the second structure, may include an input terminal 6215 that allows an external input, and the terminal controller 630 may modify a display mode of the common game symbols 510, based on an input to the input terminal 6215. With the structure, the display mode of the common game symbols 510 in the common game is externally modifiable. Therefore, the entertainment characteristic is further improved.

The common game symbols 510 and the base game symbol 511 form the plurality of symbols 501. That is, the symbol 501 is a superordinate concept of the base game symbol 511 and the common game symbol 510. In the present embodiment, the common game symbols 510 include a battle royal symbol 510*a*, a skull symbol 510*b*, and a blank symbol 510*c*, as illustrated in FIG. 15. Note that these three symbols are included only in the common game symbols 510.

That is, the common game symbols 510 are not included in the base game symbols 511

The wording "weighting value" indicates the number of points corresponding to the common game symbol 510. In the present embodiment, the battle royal symbol 510*a* is associated with "+100", and the skull symbol 510*b* is associated with "−100", and the blank symbol 510*c* is associated with "0". That is, the points of a single common scrolling process is the total of products each resulting from multiplying the number of identical symbols rearranged on the lower image display panel 16 by the corresponding weighting value. Note that the present invention is not limited to this, and the above mentioned points may be given when a predetermined number or more of the same type of the common game symbols 510 are arranged on a predetermined line. Alternatively, the above mentioned points may be given when a predetermined number or more of the same type of the common game symbols 510 are rearranged.

The "identification information" is information for identifying the slot machine 10. The identification information may be a number or the like stored in advance in the slot machine 10, or a number or the like that are given to each slot machine 10 connected to the center controller 200, when the slot machine 10 is booted.

The base game symbols 511 include specific symbols 503 and ordinary symbols 502. That is, the base game symbols 511 is a superordinate concept of the specific symbols 503 and ordinary symbols 502. In the present embodiment, the specific symbols 503 include wild symbols 503*a* and trigger symbols 503*b*, as illustrated in FIG. 14. Each wild symbol 503*a* is a symbol substitutable for any type of the ordinary symbols 502. Trigger symbol 503*b* is a symbol serving as a trigger for starting at least a bonus game. That is, the trigger symbol 503*b* triggers transition from the regular game to the bonus game, and triggers stepwise increases in the number of specific symbols 503 at intervals from the start of the bonus game. Further, the trigger symbol 503*b* triggers increases in the number of specific symbols 503 in the bonus game, that is, the trigger symbol 503*b* triggers increases in the number of trigger symbols 503*b* and/or wild symbols 503*a*. Note that the trigger symbol 503*b* may trigger increases in the game repeat count of the bonus game in the bonus game.

(Functional Block of Gaming Machine 300: Slot Machine)

The gaming machine 300 having the above structure includes slot machines 10 and the external control device 621 (center controller 200) data-communicably connected to the slot machines 10, as illustrated in FIG. 2. The external control device 621 is data-communicably connected to the slot machines 10 installed in the hall.

Each slot machine 10 includes a bet button unit 601, a spin button unit 602, a display unit 614, and a terminal controller 630 which controls these units. Note that the bet button unit 601 and the spin button unit 602 each are a kind of an input device. Further, the slot machine 10 includes a transmission/reception unit 652 which enables data communication with the external control device 621.

The bet button unit 601 has a function of accepting a player's operation for entering a bet amount. The spin button unit 602 has a function of receiving a start of a game such as base game through a player's operation; i.e., start operation. The display unit 614 has a function of displaying, in the form of a still image, various symbols 501, numerical values, marks, or the like, and displaying moving pictures such as an effect movie.

The terminal controller 630 includes: a coin insertion/start-check unit 603; a base game running unit 605; a common game running unit 653; a random number sampling unit 615; a symbol determining unit 612; an effect-use random number sampling unit 616; an effect determining unit 613; a speaker unit 617; a lamp unit 618; a winning determining unit 619; a payout unit 620; a point calculation unit 650; a symbol column image storage 661; a common game symbol value storage 662; and a symbol column image updating unit 670.

The coin insertion/start-check unit 603 determines which one of the base game, the bonus game, the common game, and the like is to be started, and determines whether the determined one of the regular game, the bonus game, the common game, and the like is startable, based on signals output from the bet button unit 601 and the spin button unit 602, and a signal or the like from the center controller 200.

The base game running unit 605 has a function of running a regular game on condition that the bet button unit 601 is operated. The base game running unit 605 determines whether to run a bonus game, based on a combination of rearranged symbols 501 resulted from the regular game. That is, the base game running unit 605 has functions of: (a) determining that the player is entitled to a bonus game, when a trigger symbol 503*b* is rearranged so as to satisfy a predetermined condition; and (b) performing control to run the bonus game from the subsequent unit game.

Further, the base game running unit 605 has a function of outputting the state of the base game to the center controller 200, via the transmission/reception unit 652. That is, the base game running unit 605 outputs the running status information to the center controller 200.

The common game running unit 653 has a function of running the common game, based on a game start command from the center controller 200.

The symbol determining unit 612 has: a function of determining symbols 501 to be rearranged, by using a random number given by the random number sampling unit 615; a function of rearranging selected symbols 501 on the symbol display region 614*a* of the display unit 614; a function of outputting information of the symbols 501 rearranged, to the winning determining unit 619; a function of outputting an effect designation signal to the effect-use random number sampling unit 616, based on the conditions of the rearrangement of the symbols 501.

More specifically, the symbol determining unit 612 has functions of: selecting the symbol column image 500 according to the game (base game or common game); scroll displaying the symbol column image 500 selected on the display unit 614; and stopping the scroll display to rearrange the symbols 501 determined.

Further, the symbol determining unit 612 has a function of outputting rearrangement information of the common game symbol 510 to the point calculation unit 650, in the common game.

The effect-use random number sampling unit 616 has functions of, when receiving the effect instruction signal from the symbol determining unit 612, sampling an effect-use random number; and outputting the effect-use random number to the effect determining unit. The effect determining unit has: a function of determining an effect by using the effect-use random number; a function of outputting, to a video display region 614*b* of the display unit 614, video information in the effect thus determined; and a function of outputting audio information and illumination information of the effect to the speaker unit 617 and the lamp unit 618, respectively.

The winning determining unit 619 has a function of determining whether a winning is resulted when information of symbols 501 rearranged and displayed on the display unit 614 is given; a function of calculating a payout when it is determined that a winning has resulted, based on the winning combination; and a function of outputting to the payout unit 620 a payout signal which is based on the amount of payout. The payout unit 620 has a function of awarding the player a game value in the form of a coin, a medal, credit, or the like, based on a payout signal from the winning determining unit 619 or the center controller.

The symbol column image storage 661 has a function of storing the symbol column image 500 to be scroll displayed on the display unit 614. Specifically, the symbol column image storage 661 stores a plurality of base game symbol column images 500*a* each including the base game symbols 511 used in the base game, and a plurality of common game symbol column images 500*b* each including the common game symbols 510.

The common game symbol value storage 662 has a function of storing the common game symbols 510 each in association with the weighting value.

The point calculation unit 650 has a function of calculating points, based on the rearrangement information of the common game symbol 510 from the symbol determining unit 612, and the weighting value of the common game symbol value storage 662.

The transmission/reception unit 652 has functions of: outputting the running state of the base game, points calculated in the common game, or the like to the center controller 200, along with the identification information of each slot machine 10; and receiving the game start command from the center controller 200, and the common game symbol column image 500*b*, or the like.

The symbol column image updating unit 670 has a function of modifying the common game symbol column image 500*b* already stored in the symbol column image storage 661, with the common game symbol column image 500*b* from the transmission/reception unit 652.

(Functional Block of Gaming Machine 300: External Control Device)

The slot machines 10 structured as described above are connected to the external control device 621. The external control device 621 has a function of remotely controlling and remotely monitoring an operating condition of each slot machine 10 or a process of changing set values of various games, for example. Further, the external control device 621 has a function of running the common game in a plurality of slot machines 10 simultaneously.

Specifically, as illustrated in FIG. 2, the external control device 621 includes a common game running unit 6211, a game start command unit 6212, a payout determining unit 6213, a terminal information memory 6214, an input terminal unit 6215, and a transmission/reception unit 6217.

The common game running unit 6211 has functions of determining whether to start the common game, based on the state of the base game obtained from the terminal controller 630, and synchronizing the common game run in each of the slot machines 10. The game start command unit 6212 has a function of outputting the game start command to the slot machine 10. The terminal information memory 6214 has a function of storing, in association with each piece of identification information, points output from the terminal controller 630 at each common scrolling process during the common game. The payout determining unit 6213 determines a payout of each slot machine 10 in the common game, based on the points stored in the terminal information memory 6214.

The input terminal unit 6215 is provided in such a manner that an external device or the like 1000 storing the common game symbol column image 500*b* is connected. When the external device or the like 1000 is connected to the input terminal unit 6215, the input terminal unit 6215 outputs the common game symbol column image 500*b* to the slot machines 10 connected. The transmission/reception unit 6217 has a function of enabling data transmission-reception among the slot machines 10.

(Operation of Gaming Machine 300)

The following describes, with reference to FIG. 3, an operation of the gaming machine 300 having the above described functional blocks. Note that in the present embodiment, the "gaming terminal" in the flow chart refers to a slot machine 10 which runs a slot game. The "gaming terminal"; however, is not limited to this.

(Operation of Slot Machine 10)

The slot machine 10 serving as a gaming terminal executes terminal-side processes (S1) to (S8). Specifically, a base game process (regular game or the like) is run first (S1).

When the slot machine 10 receives a game start signal from the external control device 621, the slot machine 10 starts and runs a common game (S2). Thus, as illustrated in FIG. 1, a screen display of the base game is switched to a screen display of the common game.

After that, whether to start the scroll display is determined (S3). Specifically, there is determined whether a synchronizing signal for synchronizing the common scrolling process in the common game is received from the center controller 200. When no synchronizing signal is received (S3: NO), the process of A3 is re-executed.

When the slot machine 10 receives a synchronizing signal (S3: YES), the common scrolling process is executed (S4). Specifically, the selected symbol column image 500 for the common game, in the symbol column image storage 661, is scroll displayed on the display unit 614, and then stopped to rearrange the common game symbol 510.

Then, the slot machine 10 calculates the points based on the common game symbols 510 rearranged (S5). Specifically, for each of the common game symbols 510 rearranged, the slot machine 10 calculates the points with reference to the corresponding weighting value stored in the common game symbol value storage 662, and outputs point information containing information of the calculated points to the center controller 200.

Then, the slot machine 10 determines whether it is the end of the common game (S6). Specifically, the slot machine 10 determines whether or not a game end signal for ending the common game is received from the center controller 200. When no game end signal is received (S6: NO), the process returns to S3.

Then, the slot machine 10 determines whether there is a payout, based on the payout information from the center controller 200 (S7). If there is no payout (S7: NO), the process returns to S1. When there is a payout (S7: YES), a payout is awarded based on the payout information (S8). The process then returns to S1. Note that the payout information may be contained in the game end signal, and the payout may be determined based on the game end signal. Alternatively, the end of common game may be determined by the payout information.

(Operation of External Control Device 621)

The external control device 621 executes the following center-side processes of (S11) to (S19) in synchronization with the slot machines 10, while the slot machines 10 are being in operation as described above.

First, the external control device 621 receives running status information from each of the slot machines 10 to retrieve a running status of the base game at each slot machine 10 (S11). After that, there is determined whether or not a common game start condition is met, based on the running status information having received from the slot machines 10 (S12). When the common game start condition is not met (S12, No), the process of S11 is re-executed to retrieve the running status of the base game at each slot machine 10.

Meanwhile, when the common game start condition is met (S12, Yes), a game start command is simultaneously output to all the slot machines 10 (S13).

Next, the external control device 621 outputs the synchronizing signal (S14). Then, the external control device 621 enters the standby mode until point information is received from the slot machine 10. When the point information is received, the reception triggers accumulatively storing of the points in the terminal information memory 6214, in association with the identification information.

Next, the external control device 621 determines whether to end the common game (S16). In the present embodiment, the common game is ended when any of the slot machines 10 wins a predetermined points or more. However, the present invention is not limited to this. For example, a common game ending condition may be an elapse of a predetermined period, or repetition of the common scrolling process a predetermined number of times. When the common game is not to be ended (S16: NO), the process returns to S14.

On the other hand, when the common game is to be ended (S16: YES), the game end signal is output to the slot machines 10 (S17). Then, the payout of each slot machine 10 is determined (S18), based on the points accumulatively stored in the terminal information memory 6214, in association with the corresponding piece of identification information identifying that slot machine 10, and the payout is output in the form of payout information (S19). The process then returns to S11. Note that when the payout information is in the game end signal, the process of S18 is executed prior to the process of S17, and then the payout information is output to the slot machine 10 as the game end signal.

As described above, the gaming machine 300 includes the slot machines 10 and the external control device 621, each of which slot machines 10 executes the terminal-side process of (S1) to (S8), and the external control device 621 executes the center-side processes of (S11) to (S19).

As described, different symbol column images 500 are scroll displayed in the unit game and the common game, respectively, and a plurality of symbols 501 are rearranged. Thus, while the unit game and the common game are similar to each other and symbols 501 are rearranged in the both games, the use of different symbol column images 500 enables distinguishing of the both games from each other. As a result, while a player is able to know which game is currently running, the player is also able to easily understand the both the unit game and the common game. Thus, the gaming machine 300 is provided with a function of a common game that achieves a high entertainment characteristic.

Further, while a payout of the regular game is determined for each unit game, a payout in the common game is determined for each of the slot machines 10, according to the accumulated points calculated based on the common game symbols 510 rearranged in each of the common scrolling processes. Thus, the payout of the common game is determined according to the points having won by a player playing on a slot machine 10. This allows improvement of the player's feeling of accomplishment, when the player receives the payout of the common game. As the result, the gaming machine 300 can provide a further improved entertainment characteristic.

Figure 4:
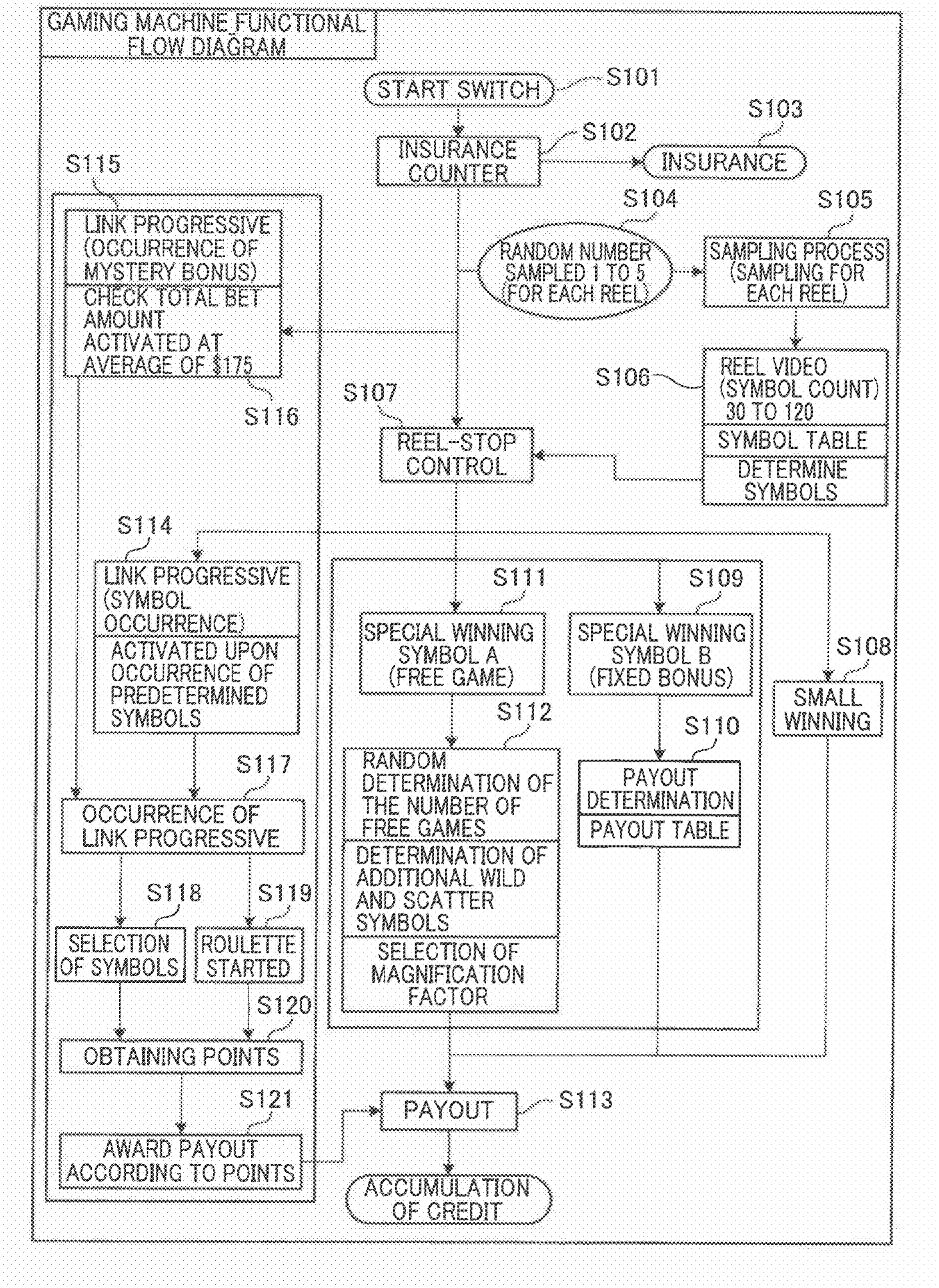
FIG. 4 is a flowchart showing the basic functions of the gaming machine.

With reference to the functional flowchart of FIG. 4, basic functions of a gaming machine 300 according to the present embodiment are described.

(Start Switch)

First, the slot machine 10 executes a start switch process (S101). First, in S101, the slot machine 10 checks if the BET button unit 601 is pressed by the player, and if the spin button unit 602 is subsequently pressed by the player.

(Insurance)

Next, the insurance counter process related to an insurance is executed (S102). Insurance is a function provided for the purpose of salvaging a player when the bonus game is not run for a long period of time. In the present embodiment, the activation of the insurance is selectable by a player. The insurance is activated in exchange of a predetermined amount of game media for purchasing the insurance.

When the insurance is activated, the gaming machine 300 starts counting the number of games played. Then, when the counted number of games played reaches a predetermined number without any award of a large amount of game media from a bonus game or the like, the gaming machine 300 awards an amount of game media set as the insurance (S103).

(Symbol Determine)

Next, when the player presses the spin button unit 602, the slot machine 10 extracts a random number for symbol determination (S104, S105). Then, for each video reel 150 displayed on the display unit 614, the slot machine 10 determines symbols 501 to be presented to the player when scrolling of symbol columns is stopped (S107).

In the present embodiment, the display unit 614 (lower image display panel 16) has five video reels 150 which are areas for scroll displaying the symbol column image 500, and rearranging the symbols 501. In S104 and S105, a random number is sampled for each of the five video reels 150. Then, in S106, symbols 501 to be rearranged (to-be stopped symbols) are determined according to the random number sampled, with reference to the symbol table in which 30 to 120 symbols 501 of the reel video 500 are associated with random numbers.

(Symbol Stop Control)

Next, the slot machine 10 starts scrolling a symbol column of each video reel, and performs reel-stop control process for stopping the scroll so that the symbols 501 determined are presented to the player (S107).

(Winning Determination)

Next, when the symbol column of each video reel stops scrolling, the slot machine 10 determines whether a combination of the symbols 501 presented to the player yields a winning.

(Payout)

Next, when a combination of the symbols 501 presented to the player yields a winning, the slot machine 10 awards the player a profit according to the combination of the symbols 501.

For instance, when a combination of symbols 501 which yields a payout of one or more coins, the slot machine 10 pays out the number of coins according to the combination of symbols 501.

Specifically, if a combination of the symbols 501 falls under a "small winning" (S108), a payout based on that "small winning" is determined. Further, the if the rearranged symbols 501 includes a winning special symbol B, and indicates a fixed bonus (S109), a payout is determined with reference to a payout table based on the number of winning special symbols B (S110).

When the combination of symbols 501 related to triggering of a bonus game is displayed, the gaming machine 300 starts a bonus game. In the present embodiment, the free game is repeated a predetermined number of times in the bonus game. That is, symbols to be stopped are randomly selected a predetermined number of times without consumption of coins.

Specifically, when the symbols 501 rearranged include a winning special symbol A, and the bonus game including the free game is runnable (S111), the number of free games in the bonus game is randomly determined, the number of wild symbols 503*a* or scatter symbols to be increased in the symbol columns used in the bonus game is determined, and the magnification factor for winning probability is selected (S112). Then, the payout determined in the processes of S108 to S112 is awarded (S113).

(Link Progressive)

Further the gaming machine 300 provides a common game so-called Link Progressive participated by a plurality of slot machines 10. In the common game, the Link Progressive is a function of awarding a jackpot prize which is an accumulation of a part of coins pooled from the coins players consumed on the slot machines 10. Note that the jackpot prize may be awarded to the player of a slot machine 10 having satisfied a Link Progressive occurrence condition. For example, Link Progressive occurs as follows.

When a symbol combination related to a jackpot trigger is displayed on any of the slot machines 10 (S114), the gaming machine 300 causes occurrence of the Link Progressive (S117).

Further, the gaming machine 300 causes occurrence of Link Progressive as a Mystery bonus (S117), when a player wins a specialized lottery (S115). When a start switch process of S11 is executed, the gaming machine 300 samples a random number for a mystery bonus, and determines whether or not a mystery bonus is achieved.

In each game, the slot machine 10 calculates an amount accumulated as a jackpot prize (accumulation amount) and transmits the accumulation amount to the external control device 621. The external control device 621 adds to the jackpot prize the accumulation amount received from each slot machine 10. The gaming machine 300 causes occurrence of the Link Progressive (S117), when the average accumulation amount of the slot machines 10 reaches a predetermined amount (e.g. 175 dollars) (S116). Note that occurrence of Link Progressive may be determined based on the total of the accumulation amounts of all the slot machines 10.

When Link Progressive occurs, the gaming machine 300 executes a process such as a process of causing each slot machine 10 to select symbols (S118); or prompting a bet on a roulette shared among the slot machines 10 and starting the roulette (S119). Based on the result of the process, the gaming machine 300 determines points of each slot machine 10 (S120). Then, for each slot machine 10, a payout is determined according to the points obtained (S121) and the payout thus determined is awarded as the jackpot prize (S113).

The common game of the present embodiment described with reference to FIG. 1 to FIG. 3 is no more than one example of the Link Progressive. This common game is started on condition that, during the base game, the total of the jackpot prizes transmitted from the slot machines 10 to the center controller 200 reaches a predetermined value.

(Running Base Game)

The following specifically describes an example of a regular game as a base game run in the gaming machine 300. Note that the following description deals with a case where the lower image display panel 16 adopts video reels for arranging the symbols 501.

Figure 5:
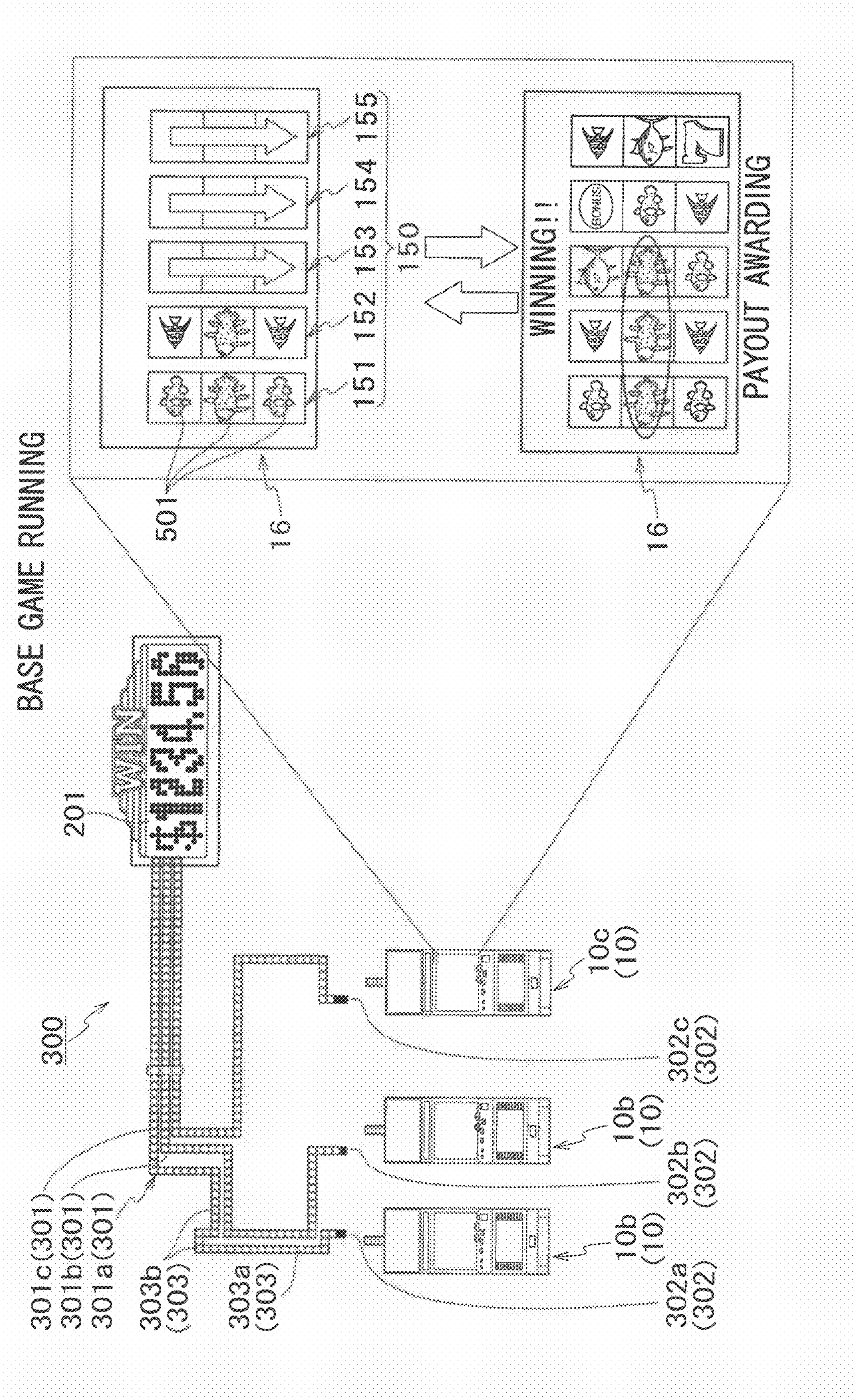
FIG. 5 is an explanatory diagram of a base game.

As illustrated in FIG. 5, the lower image display panel 16 in the slot machine 10 has five video reels 150 (151, 152, 153, 154, 155), and the symbol column image 500 is scroll displayed by using these video reels 150. Further, when the scroll display is stopped, the five video reels 150 form a symbol matrix of five columns and three rows, and includes a total of fifteen cells. Note that the symbol matrix formed by the video reels 150 is not limited to a matrix of five-columns and three-rows.

Specifically, on each of the video reels 150, the symbol column image 500 including a plurality of symbols 501 are scroll displayed. The video reels 151 to 155 are respectively divided into upper stages 151*a* to 155*a*, middle stages 151*b* to 155*b*, and lower stages 151*c* to 155*c*. Thus, there are a total of fifteen cells. The symbols 501 are stopped (arranged) in the stages 151*a* to 155*a*, 151*b* to 155*b*, and 151*c* to 155*c*, respectively. That is, in the regular game, fifteen symbols 501 are rearranged.

For the video reels 150, there are three paylines. Specifically, these paylines are set one each at the upper, middle, and lower stages of the video reels 151 to 155. The number of paylines is not limited to three, and the number of paylines may be one, two, four, or more. When the number of paylines is two or more, the number of paylines to be activated may be determined according to a predetermined condition, such as the number of coins placed as a bet. In the present embodiment, a winning is met when a predetermined number of the same symbols 501 are continuously rearranged on a payline. An arrangement of symbols whereby a winning is achieved is also referred to as a winning combination.

Note the winning condition is not limited to this. For example, a scatter symbol mode may be adopted, or the winning condition may be a combination of a multiple modes. The scatter symbol mode is a mode in which a winning is achieved when a predetermined number or more of the same symbols are arranged, no matter where these symbols are arranged.

As illustrated in FIG. 5, when the regular game is run in the slot machine 10, a plurality of symbols 501 are scroll displayed on the lower image display panel 16. When this scroll-display of symbols 501 stops, symbols 501 are rearranged in the arrangement areas 150. A winning is resulted based on a relation among the symbols 501, and a payout according to the winning is awarded.

Note that a part of a bet entered by a player is stored as a jackpot prize, each time a regular game is started. The total of jackpot prize accumulated is displayed on the bonus payout display unit 400, as a progressive jackpot.

The bonus payout display unit 400 is provided in an upper portion of the slot machine 10, and displays the progressive jackpot to be awarded in the common game, as described above. An example shown in FIG. 5 illustrates that an amount of a progressive jackpot is $1234.56. The bonus payout display unit 400 is structured to include LEDs serving as light emitting portions. However, the bonus payout display unit 400 may be structured as a single liquid crystal display. A light emitters is not limited to an LED (light-emitting diode) as long as the light emitting portion emits light.

(Common Game Running)

The following specifically describes an example of the common game in the gaming machine 300.

In the present embodiment, when an accumulated jackpot prize exceeds a certain amount, a common game is started. During the common game, the common scrolling process is repetitively executed in each slot machine 10. The display mode of the common scrolling process in the lower image display panel 16 is described below.

Figure 6:
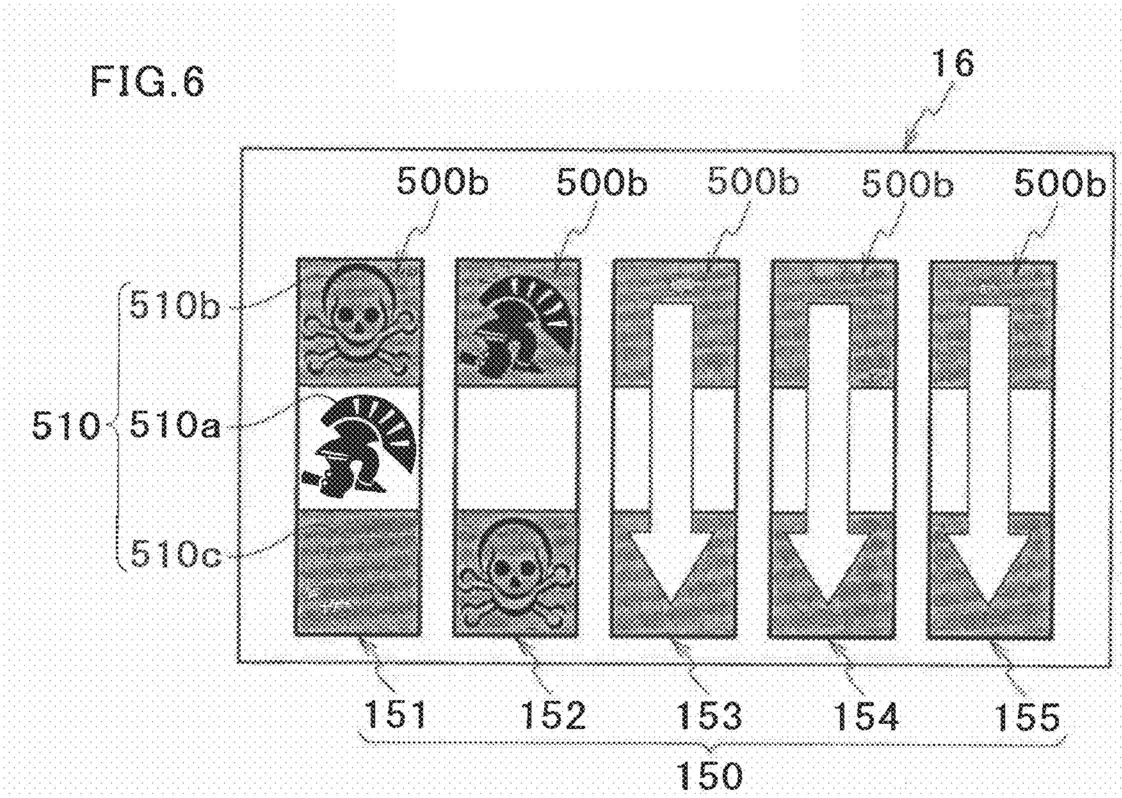
FIG. 6 is an explanatory diagram showing a display status of the symbol display device.

First, as shown in FIG. 6, the symbol column image 500 is scroll displayed on each video reel 150. Specifically, each video reel 150 individually scroll displays a common game symbol column image 500*b*, and the common game symbol column image 500*b* being scroll displayed are stopped, sequentially from the video reel 151 to the video reel 155. In the example shown in FIG. 6, the video reels 151 and 152 stop-displays the common game symbol column image 500*b*, and common game symbols 510 are rearranged on these reels. On the other hand, the video reels 153, 154, and 155 are each scroll displaying the common game symbol column image 500*b*.

Figure 7:
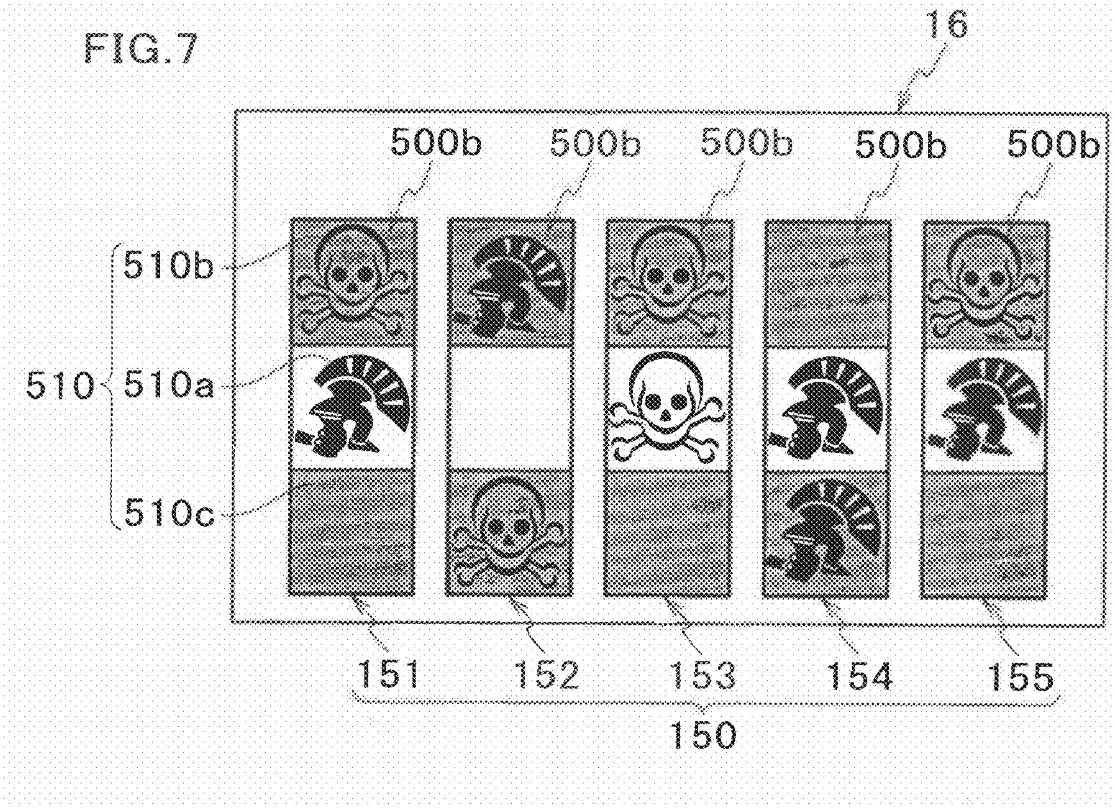
FIG. 7 is an explanatory diagram showing a display status of the symbol display device.

Then, as shown in FIG. 7, all the video reels 150 are stopped scrolling. Note that, in the present embodiment, the common game has only one payline at the central stage of the video reel 150, unlike the base game. That is, only the payline at the central stage of the video reel 150 is active, and the paylines at the upper stage and the lower stage of the video reel 150 are inactive. As shown in FIG. 6 and FIG. 7, the upper stage areas and lower stage areas of the video reel 150 are grayed out. This way, the paylines at the upper stage and the lower stage of the video reels 150 being inactive is reported to the player. Note that it is possible to only display the central stage of the video reel 150 (five columns, one row).

Further, unlike the regular game, points are calculated based on the common game symbols 510 rearranged on the payline, in the common game. Specifically, for each battle royal symbol 510*a* rearranged on the payline, "+100" points is added. That is, the battle royal symbol 510*a* is a symbol that increases the points. Further, for each skull symbol 510*b* rearranged on the payline, "−300" points are added. That is, the battle royal symbol 510*a* is a symbol that reduces the points. Further, for each blank symbol 510*c* rearranged on the payline, "0" point is added. That is, the blank symbol 510*c* is a symbol causing no change in the points.

Figure 8:
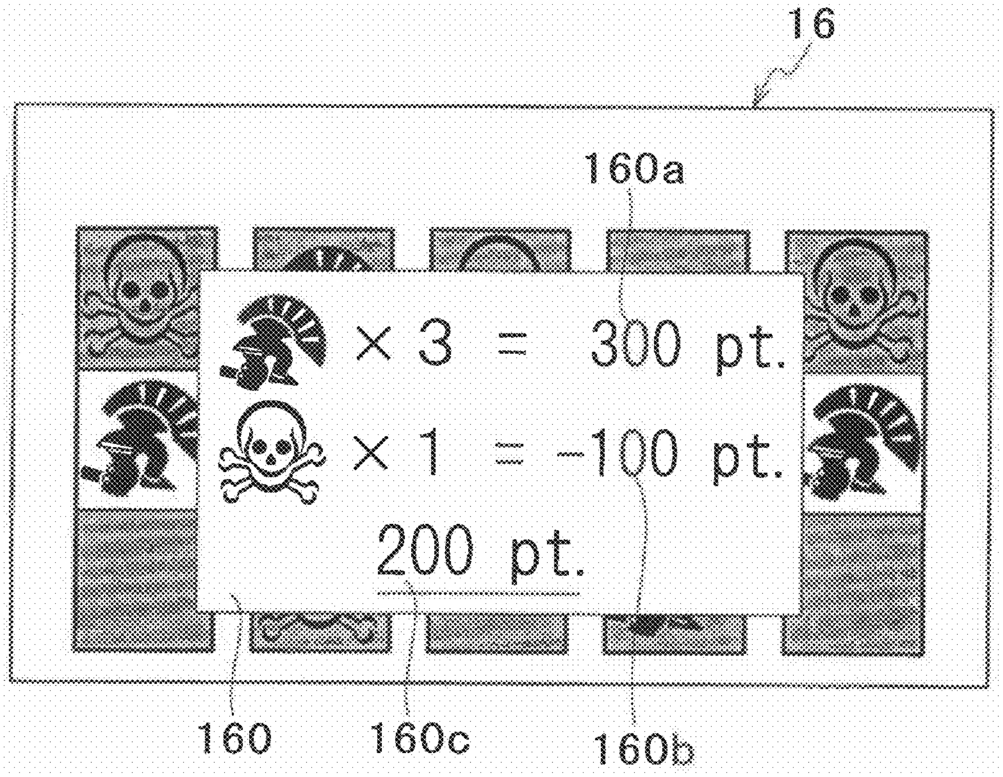
FIG. 8 is an explanatory diagram showing a display status of a symbol display device.

As shown in FIG. 8, the points resulting from the calculation as described above is displayed after the common game symbols 510 are rearranged on the video reel 150. Specifically, in a point display screen of the lower image display panel 16, there is provided a point display area 160 for displaying the points.

The point display area 160 includes an additional point display part 160*a*, a reduction point display part 160*b*, and a calculated point display part 160*c*. The additional point display part 160*a* displays the points to be added as a result of the battle royal symbol 510*a*. The reduction point display part 160*b* displays the points to be reduced as the result of the skull symbol 510*b*. The calculated point display part 160*c* displays the points as the result of calculation. The points displayed in each slot machine 10 is displayed and visualized by path units 301 of the gaming machine 300. The display mode of the path units 301 is described below.

As shown in FIG. 5, each of the path units 301 is associated with one of the slot machines 10. Specifically, each of the path units 301 having an alignment of light emitting portions 303 has one end provided to a nearby portion of associated one of the slot machine 10, and the other end provided to a nearby portion of the bonus payout display unit 400. That is, one path unit 301 has light emitting portions 303 aligned to form a path from the associated slot machine 10 to the bonus payout display unit 400.

An example indicated in FIG. 5 illustrates that a path unit 301*a* forms a path from a position 302*a* of a nearby portion of a slot machine 10*a* to the bonus payout display unit 400. Likewise, a path unit 301*b* forms a path from a position 302*b* of a nearby portion of a slot machine 10*b* to the bonus payout display unit 400. Other path units 301*c* to 301*j* are formed in the same manner. Thus, the path units 301 are respectively associated with the slot machines 10. The light emitting portions 303 are LEDs (light-emitting diodes), and controlled to light in multicolor. The each of the light emitting portions 303 turns off when inactivated, and turns on when activated.

Note that a light emitting portion 303 is not limited to an LED, as long as the light emitting portion 303 emits light. Further, an activation of the light emitting portion 303 is not limited to turning on the light emitting portion 303, but activation may be blinking the light emitting portion 303. In addition, the light emitting portion 303 may be capable of lighting only in one color; however, the light emitting portion 303 is preferably capable of lighting in multicolor in order to achieve a colorful effect.

Figure 9:
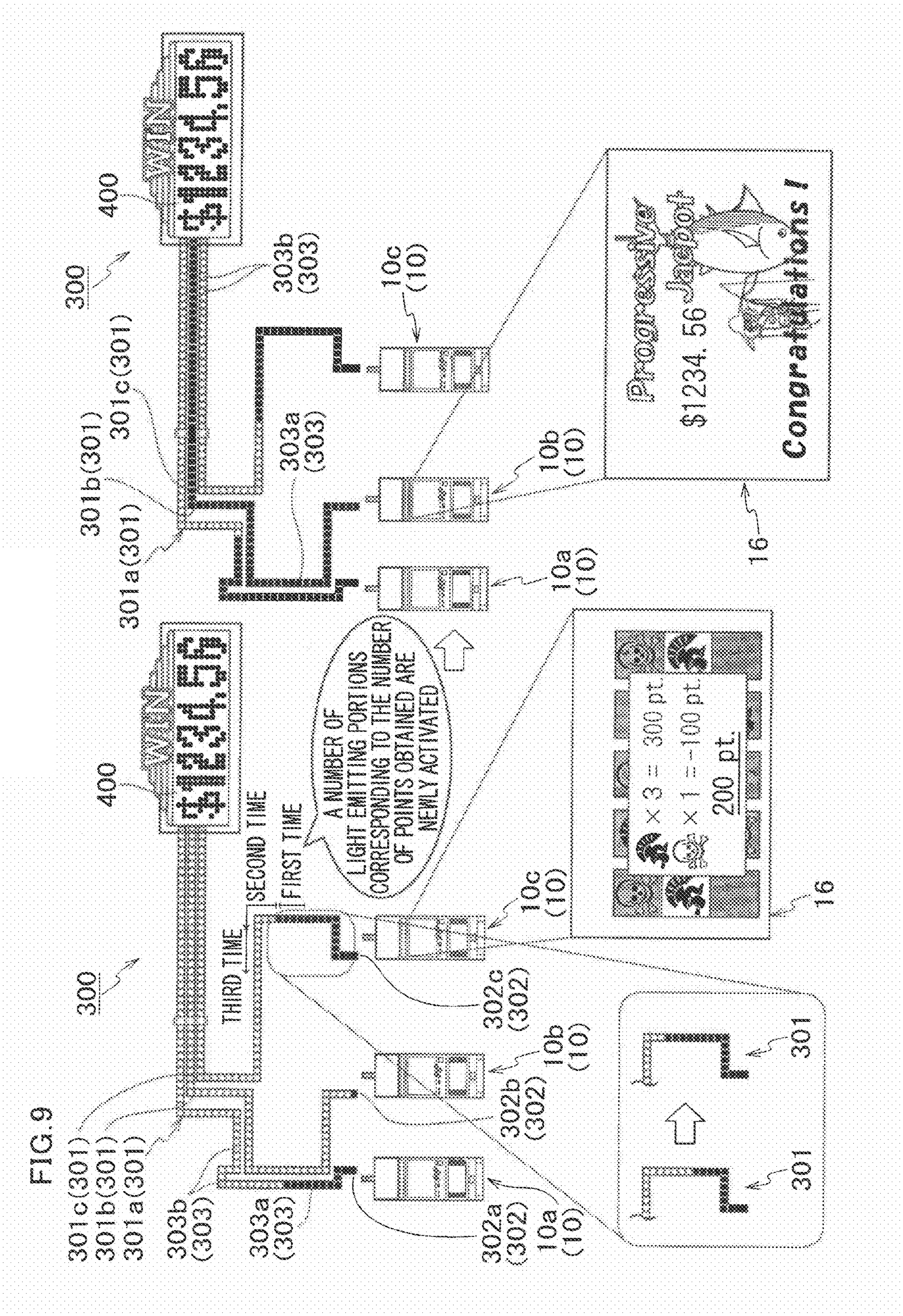
FIG. 9 is an explanatory diagram related to a common game.

In FIG. 9, activated light emitting portions 303 are indicated as light emitting portions 303*a*, and inactivated light emitting portions 303 as light emitting portions 303*b*. The light emitting portions 303 are controlled to be sequentially activated from the light emitting portion 303 of one end of one path unit 301 closer to the associated one of the slot machines 10, to the light emitting portion 303 of the other end of the path unit 301 closer to the bonus payout display unit 400. That is, the path unit 301 is controlled so that one or more of the light emitting portions 303 are additionally activated sequentially from the slot machine 10 to the bonus payout display unit 400.

In the common scrolling process, when the calculated points are displayed, a certain number of light emitting portions 303 in the path unit 301 associated with the slot machine 10 are activated according to the points (e.g. 1 light emitting portion for every 50 points). The light emitting portions 303 being activated are kept active until the end of the common game. Thus, accumulated points of each slot machine 10 is easily confirmed visually. In the present embodiment, the common game ends when all the light emitting portions 303 of any one of the path units 301 associated with a slot machine 10 are active.

(Mechanical Structure of Gaming Machine 300)

Next, the following describes a specific example of mechanical and electrical structures of the gaming machine 300 thus structured.

Figure 10:
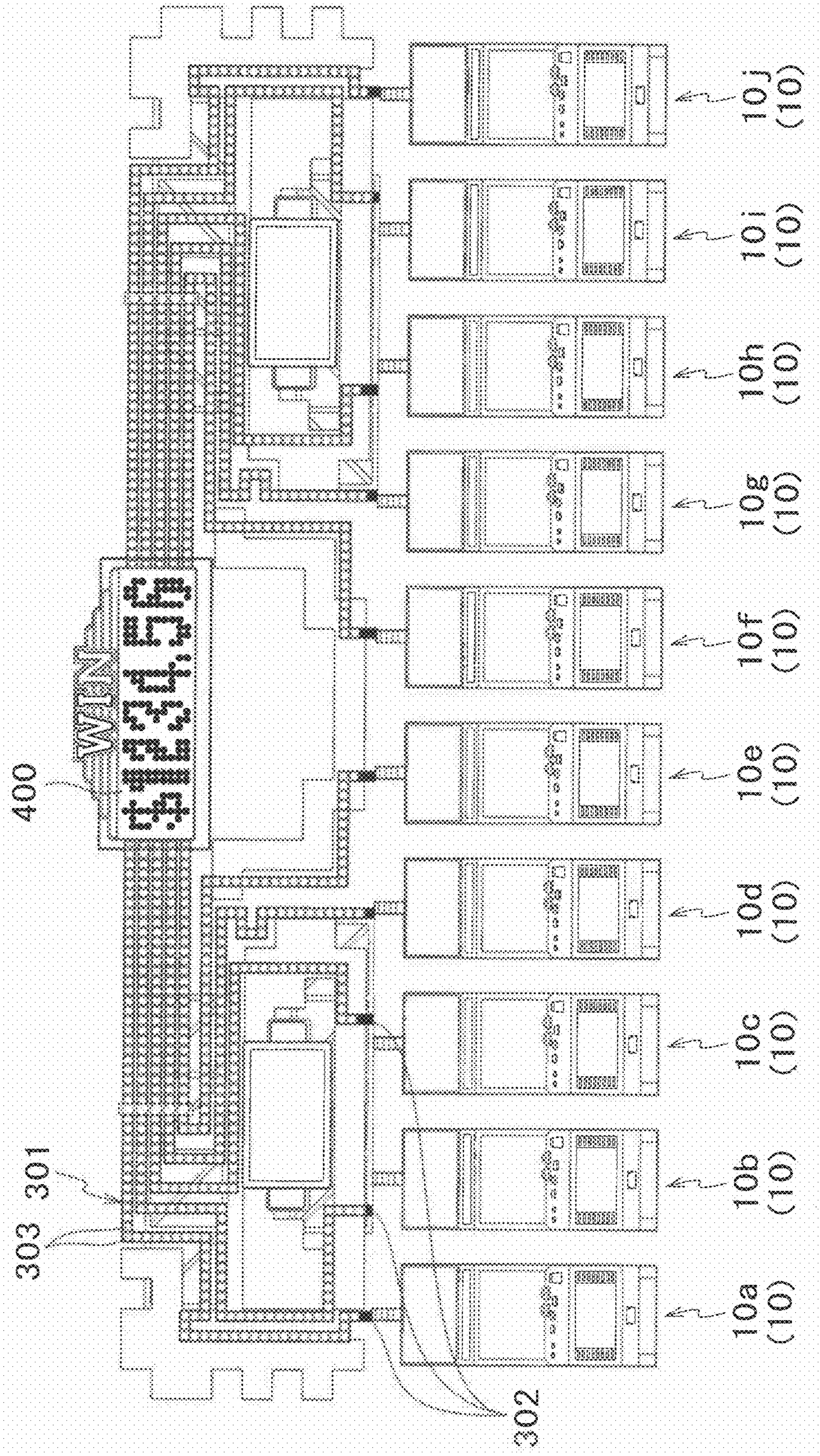
FIG. 10 is a perspective view showing the entire gaming machine.

As shown in FIG. 10, the gaming machine 300 has: slot machines 10 which runs a regular game independently of one another; a center controller 200 which runs a bonus game, is connected to the slot machines 10 and is in communication with the slot machines 10; a bonus payout display unit 400 which displays an amount of a bonus payout awarded in a common game; path units 301 respectively associated with the slot machines 10, each path unit 301 having light emitting portions 303 aligned to form a path from a corresponding position 302 allotted to the associated one of the slot machines 10 to the bonus payout display unit 400.

Figure 11:
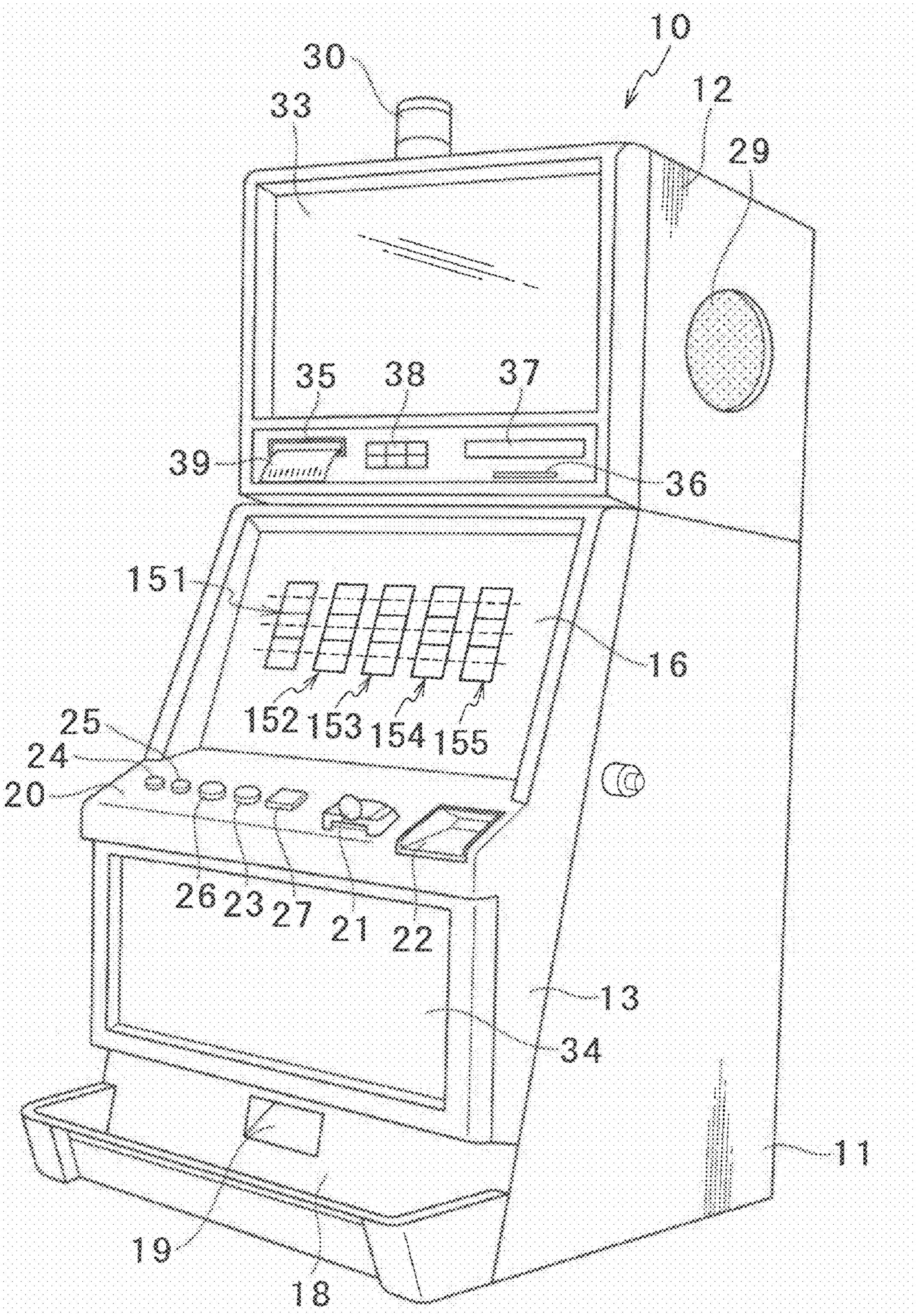
FIG. 11 is a perspective view of a slot machine in the gaming machine.

As shown in FIG. 11, the slot machine 10 includes: a cabinet 11, a top box 12 provided above the cabinet 11, and a main door 13 provided on the front surface of the cabinet 11. The main door 13 has a lower image display panel 16. The lower image display panel 16 has a transparent liquid crystal panel for displaying various kinds of information. The lower image display panel 16 displays display video reels 151 to 155 for scroll-displaying the symbol column image 500 and arranging a plurality of symbols 501. Further, the lower image display panel 16 displays various information and effect images related to a game.

The present embodiment deals with a case where the lower image display panel 16 electrically displays symbols 501 arranged in five columns/three rows. However, the present invention is not limited to this.

Note that the lower image display panel 16 may have a credit value indicator and a payout amount indicator. The credit value indicator displays a total value (hereinafter also referred to as total credit value) which a slot machine 10 can payout to a player. When symbols stopped along a payline form a winning combination, the payout amount indicator displays the number of coins to be paid out.

Below the lower image display panel 16 provided are a control panel 20, a coin insertion slot 21, and a bill validator 22. The control panel 20 is provided with various buttons 23 to 27. These buttons 23 to 27 allow a player to input instructions related to a game played by the player. Through the coin insertion slot 21, a coin is received in the cabinet 11.

The control panel 20 has: a spin button 23, a change button 24, a cashout button 25, a 1-bet button 26, and a maximum bet button 27. The spin button 23 is for inputting an instruction to start symbol scrolling. The change button 24 is used to ask a staff in the gaming facility for exchange of money. The cashout button 25 is for inputting an instruction to payout coins corresponding to the total credit value into the coin tray 18.

The 1-bet button 26 is used for betting one coin out of those corresponding to the total credit value. The maximum bet button 27 is used for betting, out of those corresponding to the total credit value, a maximum number of coins (e.g., 50 coins) which can be bet in one game.

The bill validator 22 validates whether a bill is genuine or not and receives the genuine bill into the cabinet 11. Note that the bill validator 22 is capable of reading a barcode attached to a later-mentioned ticket 39 having a bar-code (hereinafter simply referred to as ticket 39). When the bill validator 22 reads the ticket 39, it outputs to the main CPU 41*a* read signal representing information having read from the barcode.

On the lower front surface of the main door 13, that is, below the control panel 20, a belly glass 34 is provided. On the belly glass 34, a character of the slot machine 10, or the like is drawn. On the front surface of top box 12 is provided an upper image display panel 33. The upper image display panel 33 has a liquid crystal panel and displays an effect image, introduction to the game, rules of the game, or the like.

Further, the top box 12 has a speaker 29 for performing an audio output. Below the upper image display panel 33 are provided a ticket printer 35, a card reader 36, a data displayer 37, and a keypad 38. The ticket printer 35 prints on a ticket a barcode and outputs the ticket as a barcode-attached ticket 39. A barcode is encoded data containing a credit value, date and time, an identification number of the slot machine 10, or the like. A player can play a game in another slot machine 10 using the barcoded ticket 39 having the barcode, or can exchange the barcoded ticket 39 having the barcode with a bill or the like at a change booth of the game arcade.

The card reader 36 reads/writes data from/into a smart card. The smart card is carried by a player, and stores therein data for identifying the player, data relating to a history of games played by the player, or the like.

The data displayer 37 includes a fluorescent display or the like, and displays the data read by the card reader 36 and the data input by the player through the keypad 38. The keypad 38 is for entering instructions or data relating to issuing of a ticket or the like.

(Electric Structure of Gaming Machine 300)

Figure 12:
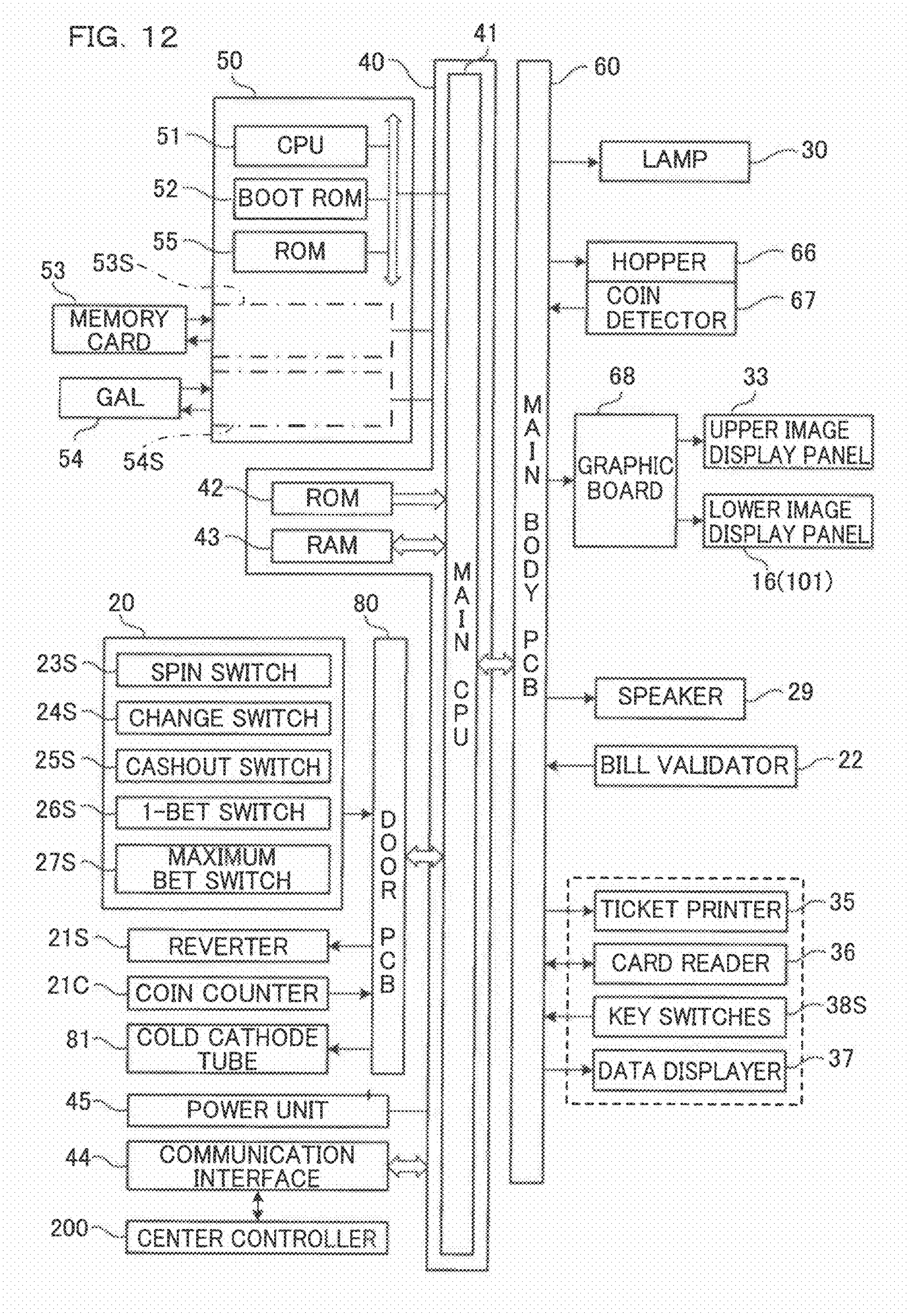
FIG. 12 is a block diagram illustrating a control circuit of a terminal controller.
Figure 13:
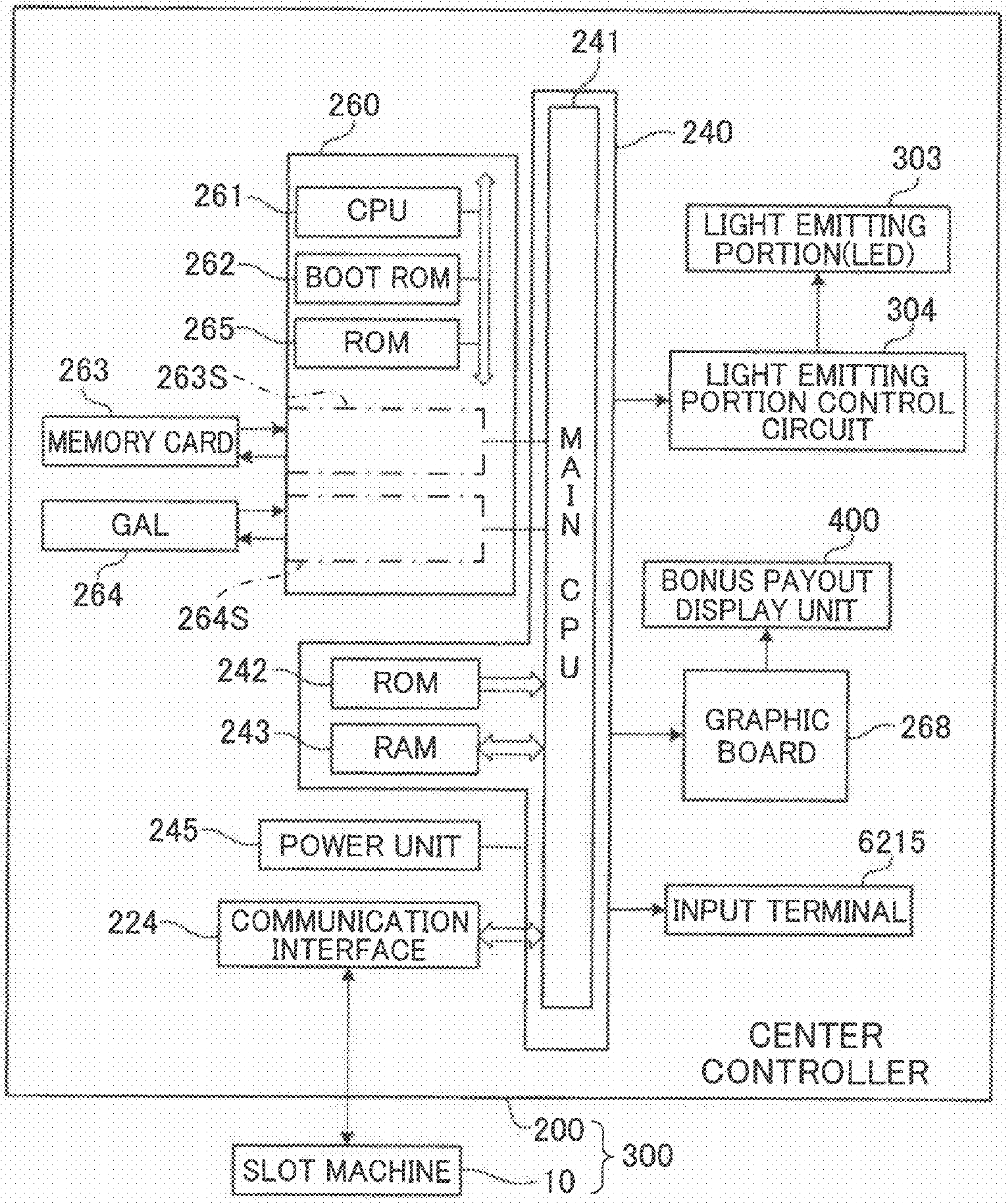
FIG. 13 is a block diagram illustrating a controller circuit of a center controller.

FIGS. 12 and 13 are block diagrams each illustrating an electrical structure of the entire gaming machine 300.

(Electric Structure of Slot Machine 10)

FIG. 12 is a block diagram illustrating an electrical structure of each of the slot machines 10. As illustrated in FIG. 12, the cabinet 11 includes a control unit having a terminal controller 630. The control unit includes a motherboard 40, a main body PCB (Printed Circuit Board) 60, a gaming board 50, a door PCB 80, various switches, sensors, or the like.

The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 stores therein a game program and a game system program. The game program contains a stop symbol determining program. The stop symbol determining program determines symbols (code number corresponding to the symbol) to be stopped in the arrangement areas 150. This stop symbol determining program contains sets of symbol weighting data respectively corresponding to various payout rates (e.g., 80%, 84%, 88%). Each set of the symbol weighting data indicates, for each of the video reels 151 to 155, a code number of each symbol and at least one random number allotted to the code number. The numerical value is a value within a predetermined range of 0 to 256 for example.

The payout rate is determined based on payout rate setting data output from the GAL 54. Based on a set of the symbol weighting data corresponding to the payout rate determined, a symbol to be stopped is determined.

The memory card 53 stores therein various types of data for use in the game programs and the game system programs. For example, the memory card 53 stores a table listing combinations of a symbol 501 to be displayed on the video reels 151 to 155 and an associated range of random numerical values. This data is transferred to the RAM 43 of the motherboard 40, at the time of running a game program.

The card slot 53S is structured so as to allow the memory card 53 to be attached/detached to/from the card slot 53S. This card slot 53S is connected to the motherboard 40 through an IDE bus. Thus, a type and contents of a game run at the slot machine 10 can be changed by detaching the memory card 53 from the card slot 53S, writing a different game program and a different game system program into the memory card 53, and inserting the memory card 53 back into the card slot 53S.

Each of the game programs includes a program related to the progress of the game and/or a program for causing a transition to a common game. Each of the game programs includes image data and audio data output during the game.

The GAL 54 has input port and output port. When the GAL 54 receives data via an input port, it outputs data corresponding to the input data from its output port. This data from the output port is the payout rate setting data described above.

IC socket 54S is structured so as to allow the GAL 54 to be attached/detached to/from the IC socket 54S. The IC socket 54S is connected to the motherboard 40, via a PCI bus. Thus, the payout rate setting data to be output from GAL 54 can be modified by: detaching the GAL 54 from the IC socket 54S, overwriting the program stored in the GAL 54, and attaching the GAL 54 back to the IC socket 54S.

The CPU 51, the ROM 55 and the boot ROM 52 connected through an internal bus are connected to the motherboard 40 through the PCI bus. The PCI bus communicates signals between the motherboard 40 and the gaming board 50 and supplies power from the motherboard 40 to the gaming board 50. The ROM 55 stores country identification information and an authentication program. The boot ROM 52 stores a preliminary authentication program and a program (boot code) for enabling the CPU 51 to run the preliminary authentication program.

The authentication program is a program (falsification check program) for authenticating the game program and the game system program. The authentication program is a program for confirming and verifying that the game program and the game system program are not falsified. In other words, the authentication program is described in accordance with a procedure for authenticating the game program and the game system program. The preliminary authentication program is a program for authenticating the authentication program. The preliminary authentication program is described in accordance with a procedure for verifying that the authentication program to be authenticated is not falsified. In short, the preliminary authentication program authenticates the authentication program.

The motherboard 40 is provided with a main CPU 41 (terminal controller 630), a ROM (Read Only Memory) 42, a RAM (Random Access Memory) 43, and a communication interface 44.

The main CPU 41 serves as a terminal controller 630 and has a function of controlling the entire slot machine 10. In particular, the main CPU 41 controls the following operations: an operation of outputting a signal instructing variable-displaying of symbols 501 to the graphic board 68, which is performed in response to pressing of the spin button 23 after betting of credit; an operation of determining symbols 501 to be stopped after the variable-displaying of symbols 501 (scroll-displaying of the symbol column image 500); and an operation of stopping the symbols 501 thus determined in the video reels 151 to 155.

In other words, the main CPU 41 serves as an arrangement controller which arranges symbols to form a new symbol matrix through scrolling of symbols displayed on the lower image display panel 16. This main CPU 41 therefore determines symbols to be arranged in a symbol matrix by selecting symbols to be arranged from various kinds of symbols. Then, the main CPU 41 executes arrangement control to stop scrolling the symbols to present the symbols thus determined.

The ROM 42 stores a program such as BIOS (Basic Input/Output System) run by the main CPU 41, and permanently-used data. When the BIOS is run by the main CPU 41, each of peripheral devices is initialized and the game program and the game system program stored in the memory card 53 are read out through the gaming board 50. The RAM 43 stores data or a program used for the main CPU 41 to perform a process.

The communication interface 44 is provided to communicate with a host computer or the like equipped in the gaming facility, through the network (communication line). The communication interface 44 is also for communicating with the center controller 200 through a communication line. Further, a main body PCB (Printed Circuit Board) 60 and a door PCB 80 are connected to the motherboard 40, through USB (Universal Serial Bus). Further, the motherboard 40 is connected to a power unit 45. The power unit 45 supplies power to the motherboard 40 to boot the main CPU 41 thereof. Meanwhile, the power unit 45 supplies power to the gaming board 50 through the PCI bus to boot the CPU 51 thereof.

The main body PCB 60 and door PCB 80 are connected to various devices or units which generate signals to be input to the main CPU 41, and various devices or units whose operations are controlled by control signals from the main CPU 41. Based on a signal input to the main CPU 41, the main CPU 41 runs the game program and the game system program stored in the RAM 43, to perform a calculation process. Then, the CPU 41 stores the result of the calculation process in the RAM 43, or transmits a control signal to the various devices and units to control them based on the result.

The main body PCB 60 is connected with the lamp 30, a hopper 66, a coin sensor 67, the graphic board 68, the speaker 29, the bill validator 22, the ticket printer 35, the card reader 36, a key switch 38S, and the data displayer 37.

The lamp 30 is turned on/off on the basis of a control signal from the main CPU 41.

The hopper 66 is mounted in the cabinet 11 and pays out a predetermined number of coins from a coin outlet 19 to the coin tray 18, based on a control signal from the main CPU 41. The coin sensor 67 is provided inside the coin outlet 19, and outputs a signal to be input to the main CPU 41 upon sensing that a predetermined number of coins have been delivered from the coin outlet 19.

The graphic board 68 controls image displaying of the upper image display panel 33 and the lower image display panel 16, based on a control signal from the main CPU 41. Further, the graphic board 68 is provided with a VDP (Video Display Processor) for generating image data on the basis of a control signal from the main CPU 41, a video RAM for temporarily storing the image data generated by the VDP, or the like. Note that image data used at the time of generating the image data by the VDP is in a game program which is read out from the memory card 53 and stored in the RAM 43.

The bill validator 22 reads an image on a bill and takes only those recognized as genuine into the cabinet 11. When taking in a genuine bill, the bill validator 22 outputs an input signal indicating the value of the bill to the main CPU 41. The main CPU 41 stores into the RAM 43 a credit value corresponding to the value of the bill indicated by the signal.

Based on a control signal from the main CPU 41, the ticket printer 35 prints on a ticket a barcode and outputs the ticket as a barcode-attached ticket 39. The barcode is encoded data containing the credit value stored in the RAM 43, date, and the identification number of the slot machine 10.

The card reader 36 reads out data from the smart card and transmits the data to the main CPU 41. Further, the card reader 36 writes data into the smart card based on the control signal output from the main CPU 41. The key switch 38S is mounted to the keypad 38, and outputs a signal to the main CPU 41 in response to an operation of the keypad 38 by the player. The data displayer 37 displays, based on a control signal from the main CPU 41, the data read by the card reader 36 or the data input by the player through the keypad 38.

The door PCB 80 is connected to the control panel 20, a reverter 21S, a coin counter 21C, and a cold cathode tube 81. The control panel 20 is provided with: a spin switch 23S associated with the spin button 23; a change switch 24S associated with the change button 24; a cashout switch 25S associated with the cashout button 25; a 1-bet switch 26S associated with the 1-bet button 26; and a maximum bet switch 27S associated with the maximum bet button 27. Each of the switches 23S to 27S outputs an input signal to the main CPU 41 when corresponding one of the buttons 23 to 27 is operated by a player.

The coin counter 21C is provided within the coin insertion slot 21, and identifies whether the coin inserted into the coin insertion slot 21 by the player is genuine. A coin except the genuine coin is discharged from the coin outlet 19. In addition, the coin counter 21C outputs an input signal to the main CPU 41 upon detection of a genuine coin.

The reverter 21S operates based on a control signal from the main CPU 41, and delivers coins that are recognized as legitimate by the coin counter 21C into a not-shown cash box or hopper 66 in the slot machine 10. In other words, when the hopper 66 is full of the coins, the genuine coin is distributed into the cash box by the reverter 21S. On the other hand, when the hopper 66 is not yet full of the coins, the genuine coin is distributed into the hopper 66. The cold cathode tube 81 functions as a backlight mounted to rear sides of the lower image display panel 16 and the upper image display panel 33. This cold cathode tube 81 turns on according to a control signal from the main CPU 41.

(Electrical Structure of Center Controller 200)

FIG. 12 is a block diagram illustrating an electrical structure of the center controller 200. The center controller 200 is provided therein with a control unit. As illustrated in FIG. 13, the control unit includes a motherboard 240, a gaming board 260, an actuator, or the like.

The gaming board 260 has the same structure as that of the gaming board 50. The motherboard 240 has the same structure as that of the motherboard 40. The communication interface 244 communicates with the terminal controller 630 through a communication line.

The graphic board 268 has the same structure as that of the graphic board 68, except in that the graphic board 268 controls displaying of the bonus payout display unit 400 based on a control signal from the main CPU 241.

A light emitting portion control circuit 304 controls an activation of an LED as a light emitting portion 303. Specifically, the light emitting portion control circuit 304 activates and inactivates the light emitting portions 303 based on a control signal output from the main CPU 241.

Further, the control unit of the center controller 200 has an input terminal 6215. The input terminal 6215 is provided in such a manner that various external devices or the like 1000 are connectable thereto. The external devices or the like 1000 each has a storage device. When the common game symbol column image 500*b* is stored in the storage device, the common game symbol column image 500*b* is input via the input terminal 6215, and is transmitted to the slot machine 10 via the communication interface 224.

(Base Game Symbol Data Table)

FIG. 14 is a diagram showing a base game symbol data table. The base game symbol table shows the base game symbol column image 500*a* formed by the base game symbols 511 of each video reel 150. To each base game symbol 511 constituting each base game symbol column image 500*a* is given one of code numbers 0 to 21.

Each base game symbol column image 500*a* has a combination of symbols of "Angelfish," "Clownfish," "7," "Tuna," "Coelacanth," "Wild Symbol 503*a*", and "Trigger Symbol 503*b*."

The base game symbol table is stored in the RAM 43.

(Common Game Symbol Table)

FIG. 15 shows a common game symbol table. The common game symbol table shows the common game symbol column image 500*b* formed by the common game symbols 510. To each of the common game symbols 510 constituting each common game symbol column image 500*b* is given one of code numbers 00 to 21. The common game symbol column image 500*b* is a combination of the "battle royal symbol 510*a*", the "skull symbol 510*b*", and the "blank symbol 510*c*". The common game symbol table is stored in the RAM 43. In the present embodiment, the same common game symbol column image 500*b* is used for each video reel 150. However, the present invention is not limited to this. For example, each video reel 150 may use a common game symbol column image 500*b* that is different from the other reels 150.

(Common Game Symbol Value Table)

FIG. 16 is a diagram showing a common game symbol value table. The common game symbol value table is a table that includes the common game symbol 510 and associated weighting value for use in point calculation. As hereinabove mentioned, the battle royal symbol 510*a* is associated with "+100" points, the skull symbol 510*b* is associated with "−100", and the blank symbol 510*c* is associated with "0". The common game symbol value table is stored in the RAM 43.

(Terminal Information Table)

FIG. 17 shows a terminal information table. The terminal information table stores information to be output from the gaming terminal to the center controller, in association with identification information for identifying a slot machine 10. Specifically, the terminal information table stores the identification information of a slot machine 10, in association with accumulated points won by that slot machine 10 within a single common game.

(Operation of Gaming Machine 300: Boot Process)

The following describes a boot process routine which takes place in the gaming machine 300. Upon powering on the gaming machine 300, a boot process routine illustrated in FIG. 18 starts in: the motherboard 240 and gaming board 260 in the center controller 200, and in the motherboard 40 and the gaming board 50 in the terminal controller 630. The memory cards 53 and 263 are assumed to be inserted into the card slots 53S and 263S of the gaming boards 50 and 260, respectively. Further, the GAL 54 and 264 are assumed to be attached to the IC socket 54S and 264S, respectively.

First, turning on the power switch of (powering on) the power units 45 and 245 boots the motherboards 40 and 240, and the gaming boards 50 and 260. Booting the motherboards 40 and 240 and the gaming boards 50 and 260 starts separate processes in parallel. Specifically, in the gaming boards 50 and 260, the CPUs 51 and 261 read out preliminary authentication programs stored in the boot ROMs 52 and 262, respectively. Then, preliminary authentication is performed according to the read out programs so as to confirm and verify that no falsification is made to authentication programs, before reading them in the motherboards 40 and 240, respectively (S21). Meanwhile, the main CPUs 41 and 241 of the motherboards 40 and 240 run BIOS stored in the ROMs 42 and 242 to load into the RAMs 43 and 243 compressed data built in the BIOS, respectively (S22). Then, the main CPUs 41 and 241 run a procedure of the BIOS according to the data loaded into the RAMs 43 and 243 so as to diagnose and initialize various peripheral devices (S23).

The main CPUs 41 and 241, which are respectively connected to the ROMs 55 and 265 of the gaming boards 50 and 260 via PCI buses, read out authentication programs stored in the ROMs 55 and 265 and stores them in the RAMs 43 and 243 (S24). During this step, the main CPUs 41 and 241 each derives a checksum through ADDSUM method (a standard check function) which is adopted in a standard BIOS, and store the authentication programs into RAMs 43 and 243 while confirming if the operation of storing is carried out without an error.

Next, the main CPUs 41 and 241 each checks what connects to the IDE bus. Then, the main CPUs 41 and 241 access, via the IDE buses, to the memory cards 53 and 263 inserted into the card slots 53S and 263S, and read out game programs and game system programs from the memory cards 53 and 263, respectively. In this case, the main CPUs 41 and 241 each reads out four bytes of data constituting the game program and the game system program at one time. Next, the main CPUs 41 and 241 authenticate the game program and the game system program read out to confirm and verify that these programs are not falsified, using the authentication program stored in RAMs 43 and 243 (S25).

When the authentication properly ends, the main CPUs 41 and 241 write and store the authenticated game programs and game system programs in RAMs 43 and 243 (S26).

Next, the main CPUs 41 and 241 access, via the PCI buses, to the GALs 54 and 264 attached to the IC sockets 54S and 264S, and read out payout rate setting data from the GALs 54 and 264, respectively. The payout rate setting data read out is then written and stored in the RAMs 43 and 243 (S27).

Next, the main CPUs 41 and 241 read out, via the PCI buses, country identification information stored in the ROMs 55 and 265 of the gaming boards 50 and 265, respectively. The country identification information read out is then stored in the RAMs 43 and 243 (S28).

Figure 19:
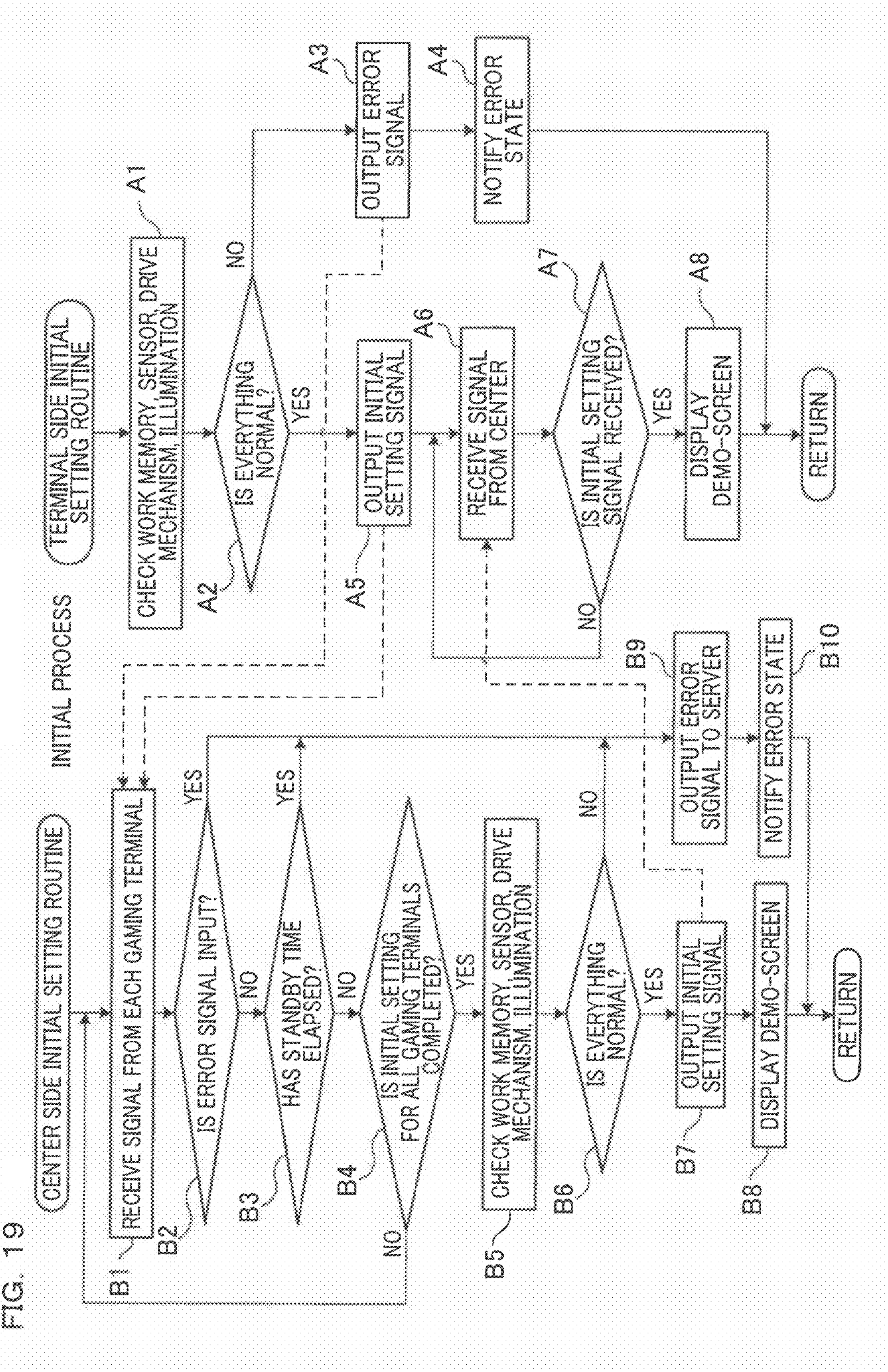
FIG. 19 is a flowchart showing an initial process executed by the gaming terminal and the center controller.

After this, the main CPUs 41 and 241 each perform an initial process of FIG. 19.

(Operation of Gaming Machine 300: Initial Process)

Figure 18:
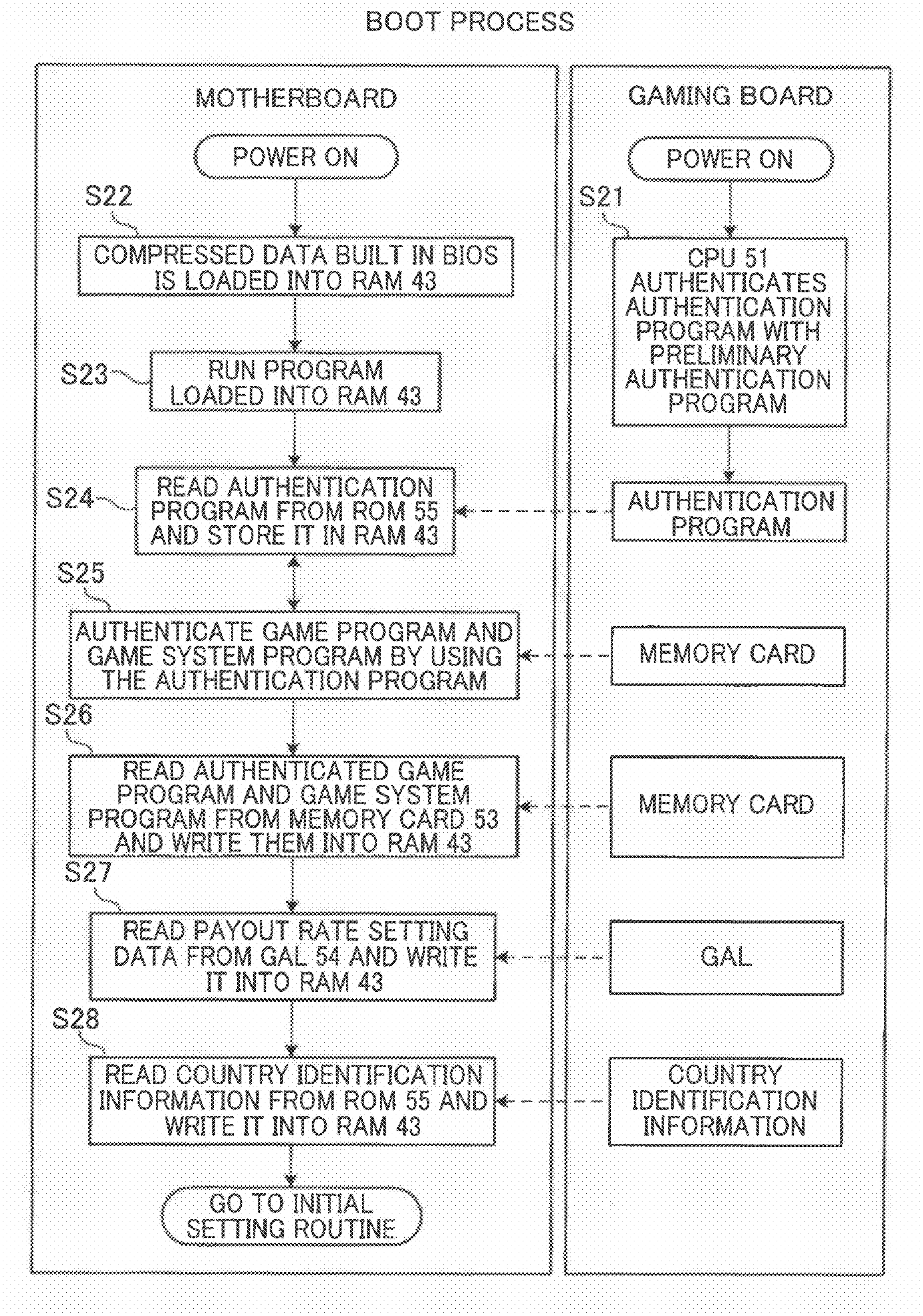
FIG. 18 is a flowchart illustrating a boot process executed by a gaming terminal and the center controller.

The following describes an initial process which takes place in the gaming machine 300. When the boot process of FIG. 18 is completed, the center controller 200 reads out from the RAM 243 a center side initial setting routine shown in FIG. 19 and executes the routine. Meanwhile, when the boot process of FIG. 18 is completed, the slot machine 10 reads out from the RAM 43 a terminal side initial setting routine shown in FIG. 19 and executes the routine. The center side and terminal side initial setting routines are executed in parallel.

First, the main CPU 41 of each of the slot machines 10 checks operations of work memories such as the RAM 43, various sensors, various driving mechanisms, and various decorative illuminations (A1). Then, the main CPU 41 determines if all the check results are normal (A2). If the main CPU 41 determines that the check results contains an error (A2: NO), the main CPU 41 outputs a signal notifying the error (hereinafter, error signal) to the center controller 200 (A3). Further, the main CPU 41 reports the error in the form of illuminating the lamp 30 or the like (A4), and then ends the routine.

On the other hand in A2, if the main CPU 41 determines that all the check results are normal (A2: YES), an initial setting signal is output to the center controller 200 (A5). Then, an initial setting signal is waited from the center controller 200 (A6, A7: NO).

The main CPU 241 of the center controller 200 receives signals from each of the terminals (B1). Then, the main CPU

241 determines whether a signal received is an error signal (B2). If the main CPU 241 determines that the signal is an error signal (B2: YES), the main CPU 241 outputs the error signal to a server of a not-shown host computer or the like (B9) to report the error (B10), and ends the routine.

On the other hand in B2, if the main CPU 241 determines that the signal is not an error signal (B2: NO), the main CPU 241 determines whether a predetermined time (check time) has elapsed from the time of powering on (B3). If the main CPU 241 determines that the check time has elapsed (B3: YES), B9 is executed. On the other hand, if the main CPU 241 determines that the check time has not yet elapsed (B3: NO), it is determined whether an initial setting signal is received from each of the slot machine (B4). If the main CPU 241 determines that an initial setting signal from any one of the slot machines 10 is not received (B4: NO), the process returns to B1. On the other hand, if it is determined that initial setting signals from all the slot machines 10 are received (B4: YES), the main CPU 241 checks operations of work memories such as RAM 243 or the like, various sensors, various driving mechanisms, and various decorative illuminations (B5). Then, the main CPU 241 determines whether all the check results are normal (B6). If the main CPU 241 determines the check results contain an error (B6: NO), the main CPU 241 executes B9.

On the other hand in B6, if the main CPU 241 determines that all the check results are normal (B6: YES), the main CPU 241 outputs an initial setting signal to all the slot machines 10 (B7), and causes the shared display 102 to display a demo-screen (B8). Then, the main CPU 241 ends the routine.

In A7, the main CPU 41 of each of the slot machines 10 determines that an initial setting signal is received from the center controller 200 (A7: YES), and causes the lower image display panel 101 to display a demo-screen (A7). The main CPU 41 then ends the routine.

(Operation of Slot Machine 10: Gaming Terminal Process Routine)

Figure 20:
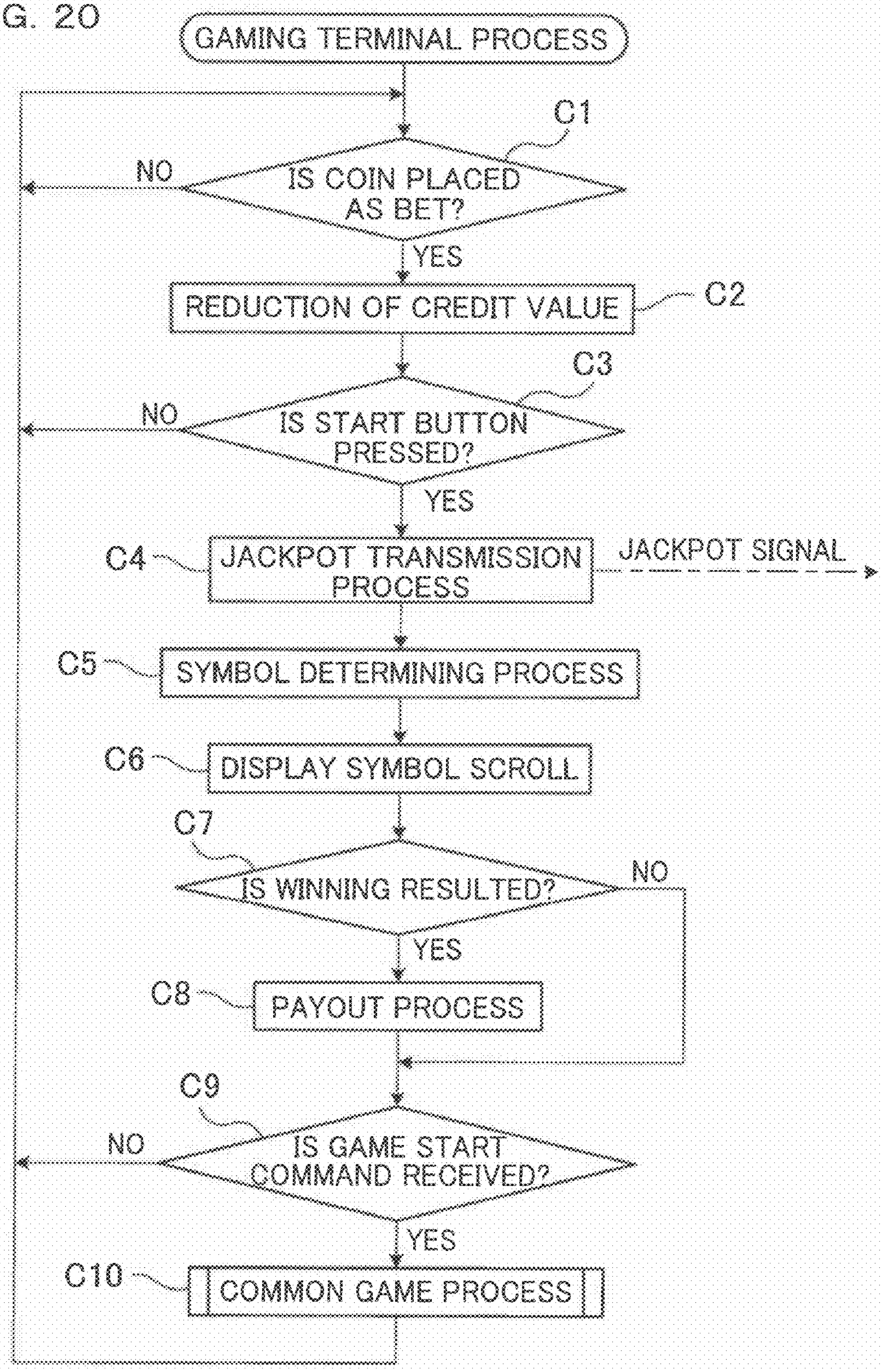
FIG. 20 is a flowchart showing a gaming terminal process routine executed in the slot machine.

After the terminal side initial setting routine of FIG. 19, the main CPU 41 of the slot machine 10 performs a gaming terminal process routine of FIG. 20. Through this gaming terminal process routine executed by the main CPU 41, a base game is run.

As shown in FIG. 20, in the gaming terminal process routine, it is determined whether a coin is bet (C1). In this step, it is determined whether a signal from the 1-bet switch 26S entered by pressing of the 1-bet button 26 is received. Meanwhile, it is determined whether a signal from the maximum bet switch 27S entered by pressing of the maximum bet button 27 is received. If no coin is bet (C1: NO), C1 is repeated until a coin is bet.

On the other hand, if a coin is bet (C1: YES), the credit value stored in the RAM 43 is reduced according to the number of coins bet (C2). When the number of coins bet surpasses the number of coins equivalent to the credit value stored in the RAM 43, C3 is repeated without the reduction of the credit value. When the number of coins bet exceeds the maximum number of coins bettable for one game (50 pieces in this embodiment), the process goes to a later-described step C3 without the reduction of the credit value.

Then, it is determined whether a spin button 23 is pressed (C3). If the spin button 23 is not pressed (C3: NO), the process returns to C1. Here, if the spin button 23 is not pressed (for example, the spin button 23 is not pressed but a command to end the game is input), the reduction of the credit value in C2 is canceled.

On the other hand, when the spin button 23 is pressed (C3: YES), a jackpot transmission process is executed (C4). In other words, a jackpot signal indicating a part of the game value bet is transmitted to the center controller 200.

Next executed is a symbol determining process (C5). That is, the stop symbol determining program stored in the RAM 43 is run to determine symbols 501 to be arranged in the video reels 150. Through this, a symbol combination to be formed along the payline is determined.

Then, the scrolling process is executed to scroll display symbols 501 on the lower image display panel 16 (C6). The scrolling process is a process in which the symbols 501 determined in C5 are stopped (rearranged) in the video reels 150 after scrolling of symbols 501 in a direction indicated by an arrow.

Next, it is determined whether a winning is resulted with the combination of symbols 501 rearranged in the video reels 150 (C7). When it is determined that a winning is resulted (C7: YES), a payout process is executed (C8). More specifically, when a winning is resulted, the number of coins according to the combination is calculated. On the other hand in C7, when it is determined that no winning is resulted (C7: NO), C9 is executed.

When the payout process of C8 is executed, the main CPU 41 subsequently determines whether a game start command is received (C9). If the game start command is not received (C9: NO), C1 is executed. When the game start command is received (C9: YES), the common game process is executed (C10). The common game process is described later with reference to FIG. 21. C1 is executed thereafter.

(Process Operation of Slot Machine 10: Common Game Process Routine)

Figure 21:
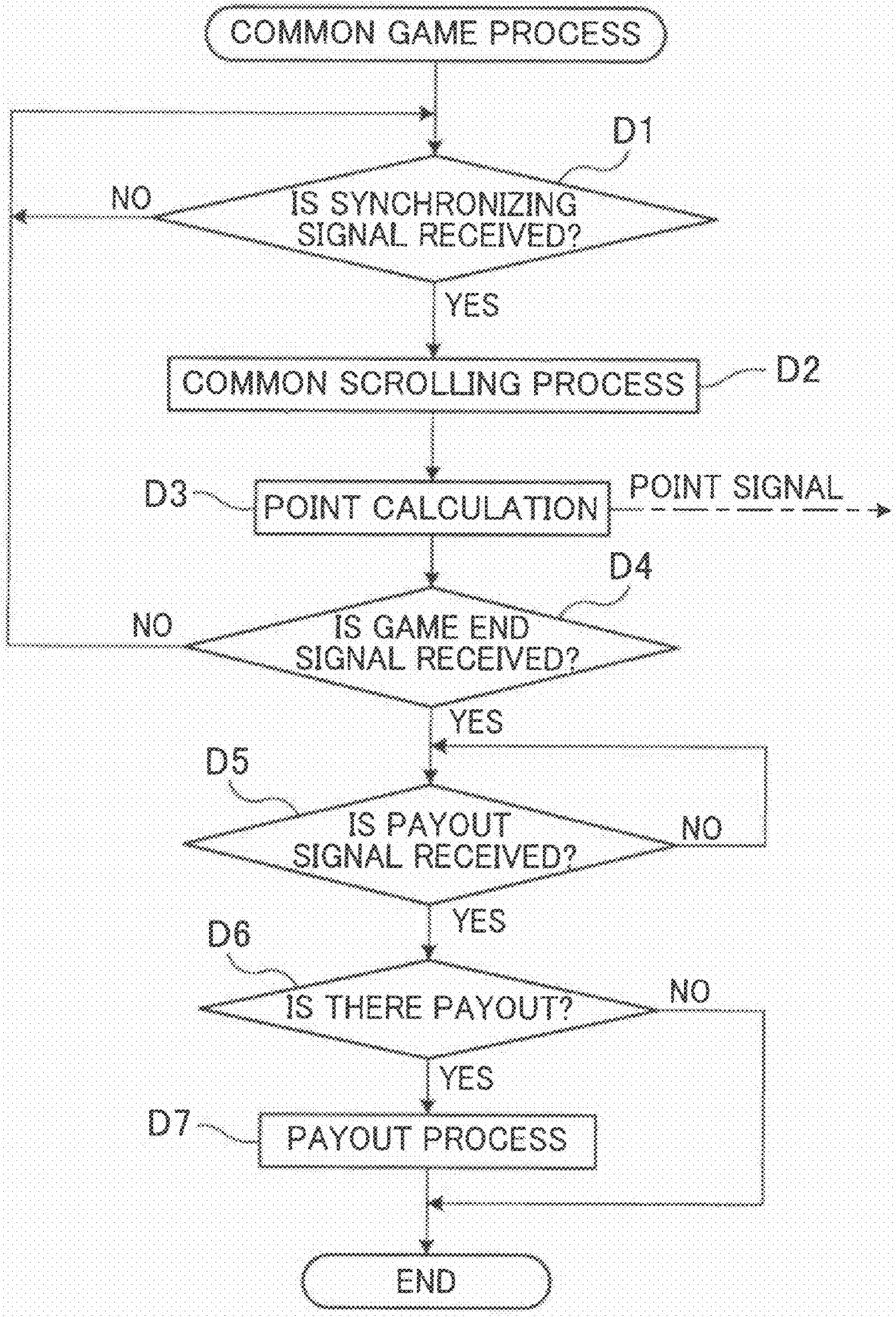
FIG. 21 is a flowchart showing a common game process routine executed in the gaming terminal.

Next, the main CPU 41 of the slot machine 10 executes the common game process routine shown in FIG. 21, in the common game process (C10) shown in FIG. 20. Through this common game process routine executed by the main CPU 41, a game is run.

Next, as shown in FIG. 21, the main CPU 41 determines whether a synchronizing signal is received from the center controller 200 (D1). If the synchronizing signal is not received (D1: NO), D1 is repeated. If the synchronizing signal is received (D1: YES), the common scrolling process is executed (D2). Specifically, the common game symbol 510 to be stopped (rearranged) on the video reel 150 is determined, and the common game symbol column image 500*b* is scroll displayed in each of the video reels 150, and then stop displayed so that the common game symbol 510 determined are rearranged on the video reel 150.

After the process of D2, the main CPU 41 executes calculation of points (D3). Specifically, there is determined how many battle royal symbols 510*a*, skull symbols 510*b*, and blank symbols 510*c* are rearranged on an active payline, based on the common game symbols 510 determined in D2. For each type of the symbols, the number of symbols thus determined is multiplied by the associated weighting value obtained with reference to the common game symbol value table. The results of this multiplication are added up to calculate the points. The points thus calculated is output to the center controller 200 as a point signal, along with the identification information.

Then, there is determined whether or not a game end signal is received from the center controller 200 (D4). If it is determined that no game end signal is received (D4: NO), D1 is executed. If it is determined that the game end signal is received (D4: YES), there is determined whether or not the payout signal is received (D5). The payout signal is output by the center controller 200, and contains payout information of the common game. When no payout signal is received (D5: NO), D5 is repeated.

On the other hand, when the payout signal is received (D5: YES), there is determined whether or not there is a payout resulting from the common game, with reference to the payout indicated by the payout information in the payout signal (D6). When there is no payout (D6: NO), this routine is ended. On the other hand, when there is a payout (D6:YES), the payout is awarded based on the payout information (D7), and then this routine is ended.

(Operation of Center Controller 200: Center Process Routine)

Figure 22:
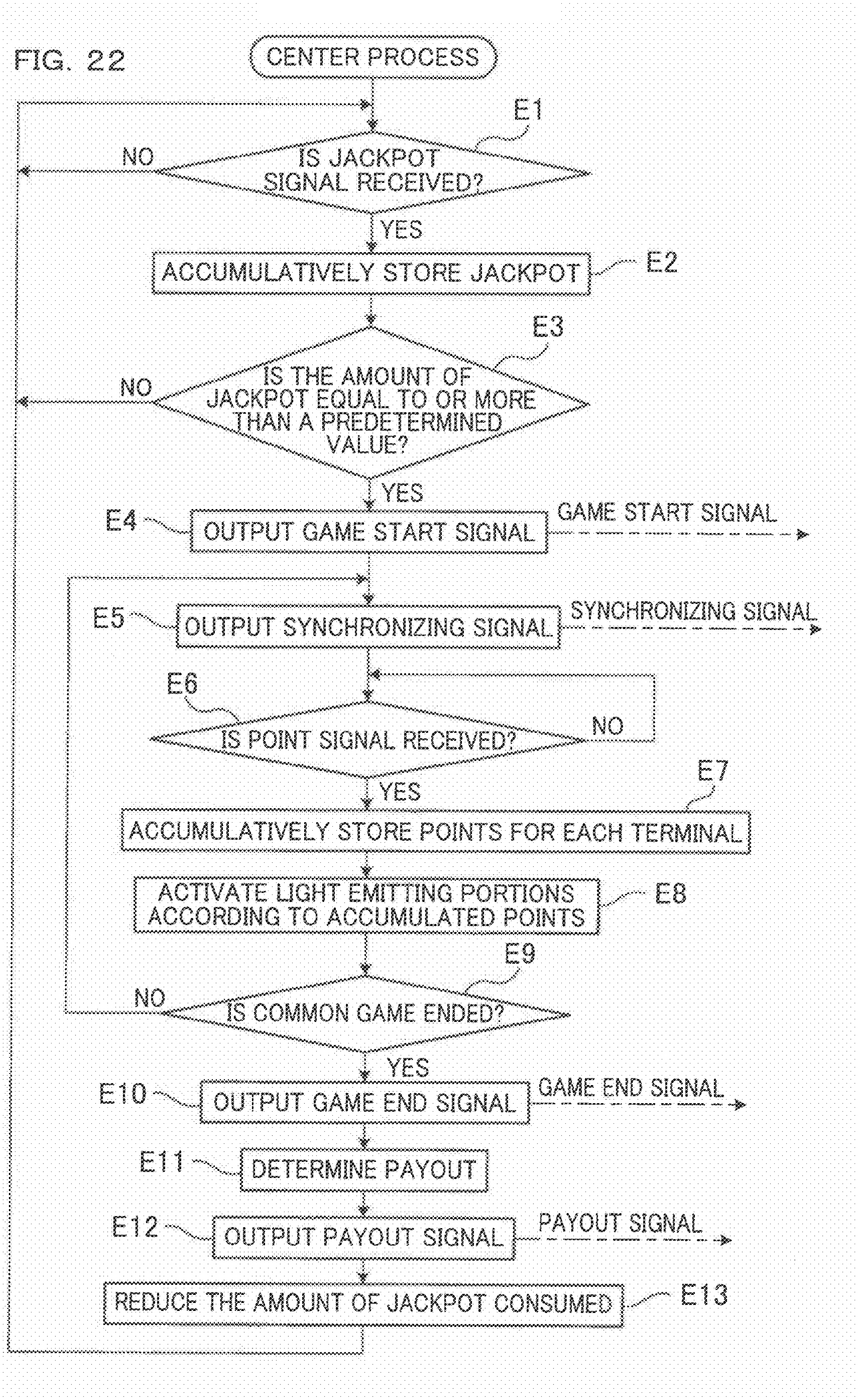
FIG. 22 is a flowchart showing a center process routine executed in the center controller.

After the center side initial setting routine of FIG. 19, the main CPU 241 of the center controller 200 executes a center process routine of FIG. 22. The main CPU 241 performs the center process routine to run a common game.

As shown in FIG. 22, in the center process routine, the main CPU 241 determines whether a jackpot signal is received from the slot machine 10 (E1). If the main CPU 241 determines that no jackpot signal is received (E1: NO), the process returns to E1.

On the other hand in E1, when the main CPU 241 determines that a jackpot signal is received (E1, YES), a game value indicated by the jackpot signal is summed up and stored (E2). Then, there is determined whether or not the jackpot equals or surpasses a predetermined value (E3). If the main CPU 241 determines that the jackpot prize is less than the predetermined value (E3: NO), the process returns to E1.

On the other hand, when the main CPU 241 determines that the jackpot prize equals or surpasses the predetermined value (E3: YES), a game start signal is output to each of the slot machines 10 (E4). After outputting the synchronizing signal to the slot machine 10 (E5), the main CPU 241 determines whether or not a point signal is received from the terminal controller 630 (E6). If the main CPU 241 determines that no point signal is received (E6: NO), E6 is repeated. On the other hand, if it the main CPU 241 determines that a point signal is received (E6: YES), points are accumulatively stored for each terminal, based on the identification information and the points contained in the point signal (E7). That is, the accumulated points of each gaming terminal in the terminal information table are updated.

Then, the main CPU 241 activates a certain number of light emitting portions 303 towards the bonus payout display unit 400, based on the accumulated points of the updated terminal information table (E8). Then, there is determined whether or not the common game is to be ended (E9). In the present embodiment, the common game ends when the points of any one of the slot machines 10 reach a predetermined value. That is, the main CPU 241 determines whether or not the points of any one of the slot machines 10 have reached the predetermined value, with reference to the terminal information table. When it is determined that the common game is not to be ended (E9: NO), E5 is executed.

On the other hand, when it is determined that the common game is to be ended (E9: YES), the game end signal is output (E10), and then a payout is determined (E11). The payout is determined for each slot machine 10, according to the points the slot machine 10 has obtained. Specifically, the slot machines 10 are ranked according to the points, and payouts are awarded to the top three slot machines 10 according to the proportion of the points of these slot machines 10. For example, where the progressive jackpot is 1,000,000 dollars, and the top three slot machines 10 earned 5000 points, 3000 points, and 2000 points, respectively, the prizes of 500,000 dollars, 300,000 dollars, and 200,000 dollars are awarded to the slot machines 10, respectively.

Note that the payout system is not limited to this. For example, the payouts are awarded to all the slot machines 10 according to the proportion of the respective points of the slot machines 10. Alternatively, the entire progressive jackpot may be awarded to the slot machine 10 having earned the most points. Further, it is possible to award a part of the jackpot, instead of paying out the entire the progressive jackpot having accumulated. For example, the jackpot awarded may be the entire jackpot minus a predetermined amount set as a minimum amount.

After a payout is determined in E10, the main CPU 241 outputs a payout signal (E12). Then, the amount of jackpot consumed is reduced from the progressive jackpot (E13), and the process returns to E1.

(Center-Side Symbol Updating Process)

Further, although illustration is omitted, the main CPU 241 of the center controller 200 is capable of detecting an input of the common game symbol image 510 via the input terminal 6215 such as USB (Universal Serial Bus). For example, the input of common game symbol image 510 is done as follows: storing the image in a predetermined storage area of the memory; an input of the common game symbol image 510 by a predetermined application program; or plugging into the input terminal 6215, a predetermined external device that stores the common game symbol image 510.

Figure 23:
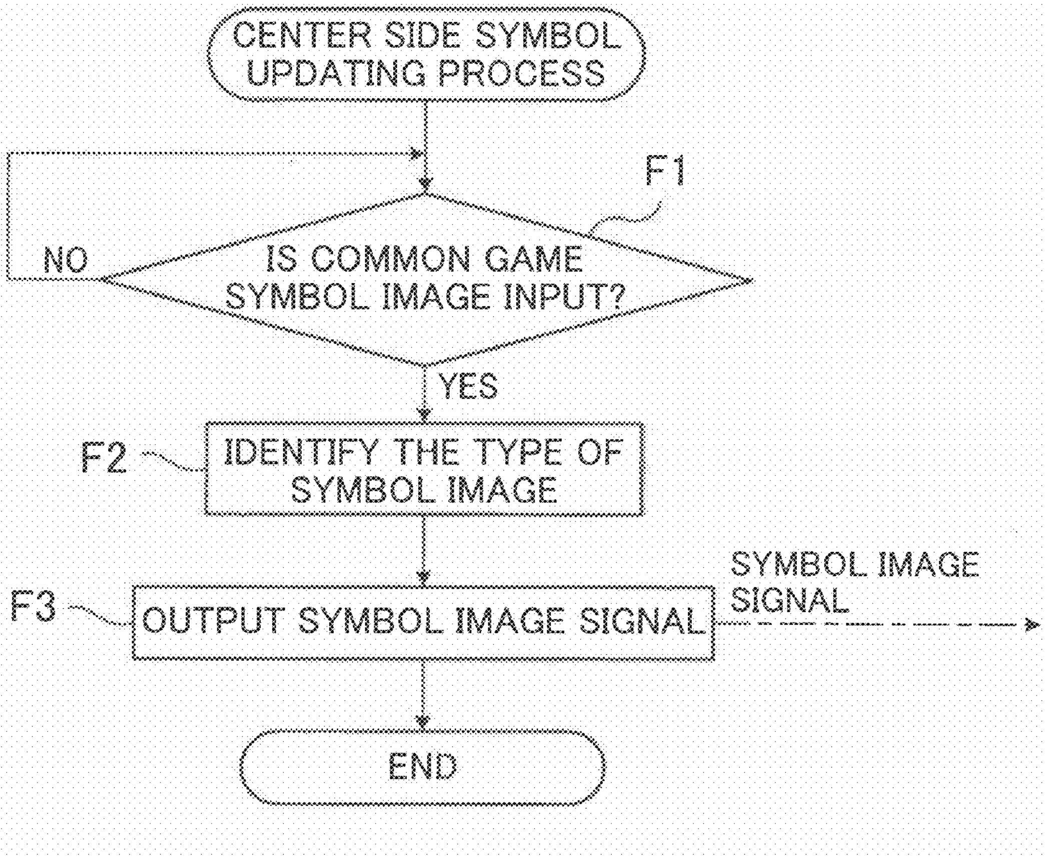
FIG. 23 is a flowchart showing a center-side symbol updating process routine executed in the center controller.

FIG. 23 shows a center-side symbol updating process routine executed by the main CPU 241 of the center controller 200, when the common game symbol image 510 is input.

As illustrated in FIG. 23, in the center-side symbol updating process routine, the main CPU 241 determines whether or not the common game symbol image 510 is input (F1). When the common game symbol image 510 is not input (F1: NO), F1 is repeated. When the common game symbol image 510 is input (F1: YES), the type of symbol image is identified (F2). That is, there is identified whether the image input is an image that modifies any one of the battle royal symbol 510*a*, the skull symbol 510*b*, and the blank symbol 510*c*. In the present embodiment, this is done by the name of the image file. However, the present invention is not limited to this. For example, the same identification may be done by the name of the folder storing the image, or by the storage area of the external device where the image is stored.

After F2, the symbol image signal is transmitted to the slot machines 10 connected to the center controller 200, which signal contains the common game symbol image 510 and the identification information of the symbol image identified in F2 (F3). For example, when the common game symbol image 510 input is an image that modifies the battle royal symbol 510*a*, the symbol image signal is an instruction signal for modifying the battle royal symbol 510*a* to the common game symbol image 510 having been input. Note that, in F1, when a plurality of common game symbol images 510 are input, F2 and F3 are executed for each of the images input. This routine ends thereafter.

(Terminal-Side Symbol Updating Process)

Figure 24:
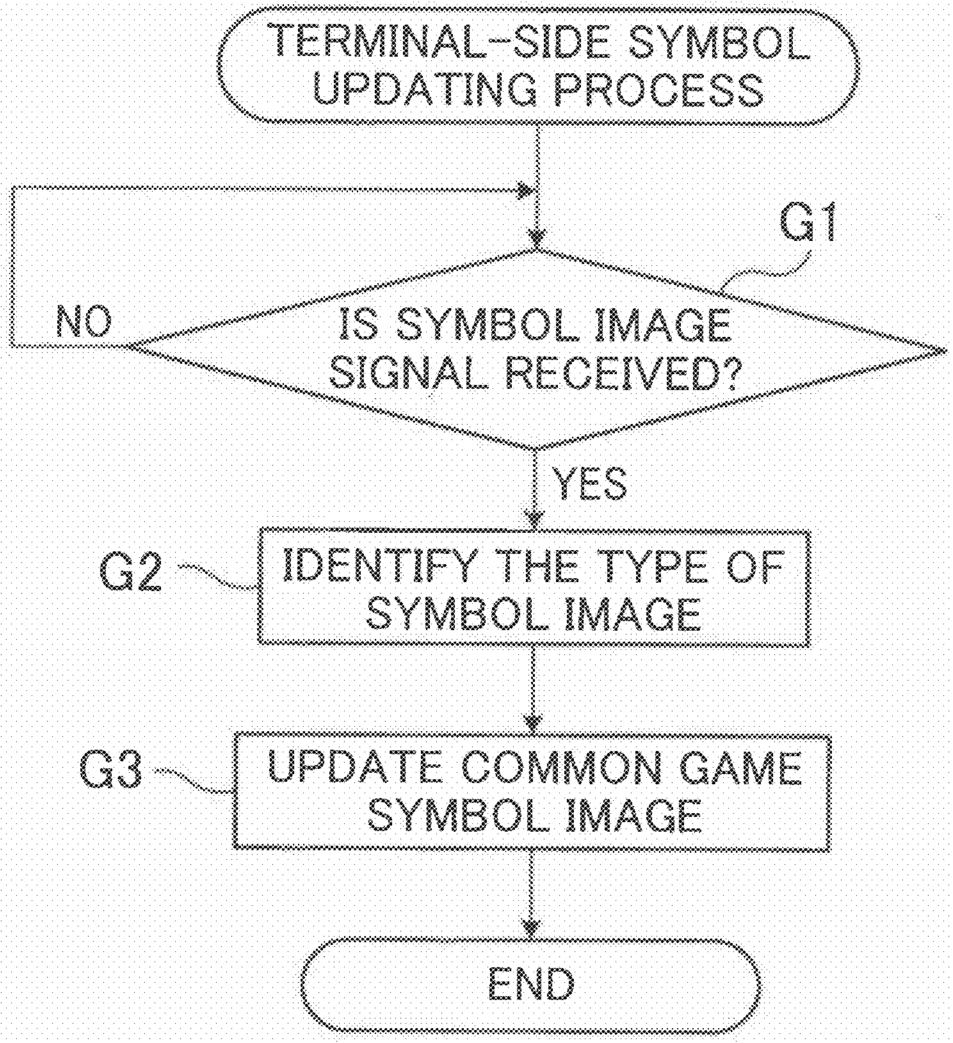
FIG. 24 is a flowchart showing a terminal-side symbol updating process routine executed in the gaming terminal.

FIG. 24 shows a terminal-side symbol updating process routine executed by the main CPU 41 of the slot machine 10, when the symbol image signal is received from the center controller 200.

As illustrated in FIG. 24, in the terminal-side symbol updating process routine, the main CPU 41 determines whether or not a symbol image signal is received (G1). When the symbol image signal is not received (G1: NO), G1 is repeated. When the symbol image signal is received (G1: YES), the type of common game symbol image 510 contained in the symbol image signal is identified (G2). That is, there is identified whether the common game symbol image 510 received is an image that modifies any one of the battle royal symbol 510*a*, the skull symbol 510*b*, and the blank symbol 510*c*.

After G2, the main CPU 41 updates the common game symbol image 510 stored in the RAM 43, with the common game symbol image 510 having been received (G3). For example, when the symbol image signal is an image that modifies the battle royal symbol 510*a*, the "battle royal" indicated on the common game symbol column of FIG. 15 is modified to the common game symbol image 510 having been received.

As described, the gaming machine 300 has the input terminal 6215 through which the center controller 200 is able to accept an input from outside, and the terminal controller executes the process of modifying the common game symbol image 510 (display mode of the common game symbol) by the symbol image signal transmitted from the center controller 200 based on the input to the input terminal. Thus, the display mode of the common game symbol in the common game is modifiable from outside. For example, a shop administrating the gaming machine 300 may customize the battle royal symbol 510*a* to any given symbol.

In the present embodiment, the image input to the center controller 200 is transmitted to the slot machines 10 to enable customizing of the common game symbol image 510. However, the present invention is not limited to this. For example, the center controller 200 may be capable of selecting a slot machine 10 whose common game symbol image 510 is to be customized. Further, the input terminal may be provided to the slot machine 10, so that the common game symbol image 510 is customized only in the slot machine 10 to which the common game symbol image 510 is input. Further, the slot machines 10 may be structured so that an input of the common game symbol image 510 to any one of the slot machines 10 will transmit the common game symbol image 510 to all the connected slot machines 10.

The above embodiment thus described solely serves as a specific example of the present invention, and the present invention is not limited to such an example. Specific structures and various means may be suitably designed or modified. Further, the effects of the present invention described in the above embodiment are not more than examples of most preferable effects achievable by the present invention. The effects of the present invention are not limited to those described in the embodiments described above.

For example, the same common game symbol column image 500*b* is used in each video reel 150 as the image to be scroll displayed in the common game. However, the present invention is not limited to this. For example, it is possible to set the jackpot prize transmitted from the slot machine 10 to the center controller 200 as the contribution level, and the number of symbols in the common game symbol column image 500*b* associated with a weighting value that causes an increase in the points may be increased according to the proportion of the contribution levels. This improves the player's motivation for continuing the game.

Further, the points are calculated by adding up the products each resulting from multiplying the number of the same common game symbols 510 by the associated weighting value. For example, only when a predetermined number or more of the same common game symbols 510 are continuously aligned on a payline, the weighted points associated with those common game symbols 510 may be added to the points. Alternatively, when the number of the same common game symbols 510 arranged equals or surpasses a predetermined number, the weighted points associated with those common game symbols 510 may be added to the points.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A gaming machine, comprising:

a plurality of gaming terminals each having a display which arranges thereon a plurality of symbols, a symbol column image storage which stores a plurality of symbol column images, having the plurality of symbols, and a terminal controller;

a central controller connected and in communication with the gaming terminals;

a terminal information memory which stores information output from each of the gaming terminals to the center controller, the information including identification information for identifying each of the gaming terminals; and, a common game symbol value storage which stores a common game symbol value table in which a plurality of common game symbols, that correspond to symbol column images only played in the common game, are associated with points that are weighed in advance, respectively, wherein the terminal controller is programmed to perform the following steps of (a1) to (a4):

(a1) repetitively running, independently of the other gaming terminals, a unit game which scrolls the symbol column image, stops the scrolling to rearrange a plurality of symbols, and determines a payout of each unit game in accordance with an arrangement of the rearranged symbols;

(a2) repetitively running, in sync with the other gaming terminals, a common game which performs a common scrolling process wherein the symbols in the unit game are replaced with the common game symbols and the common game symbols are rearranged after the scrolling of the symbol column images is stopped, in response to a common game start command from the center controller;

(a3) determining which common game symbol is obtained among the common game symbols rearranged in (a2), and calculating, each time the common scrolling process is performed, a total sum of the points corresponding to the obtained common game symbols, with reference to the common game symbol value table stored in the common game symbol value storage; and (a4) outputting the identification information and the total sum of the points to the center controller, each time the common scrolling process is performed, and wherein the center controller is programmed to execute the following steps of (b1) to (b3):

(b1) outputting the common game start command to the terminal controller, based on the process (a1) executed by the terminal controller;

(b2) accumulatively storing the total sum of the points output from the terminal controller in association with the identification information; and (b3) at a predetermining timing, determining a profit awarded to each of the gaming terminals, based on the total sum of the points accumulatively stored in the terminal information memory.

2. The gaming machine according to claim 1, further comprising an input terminal that allows an external input, wherein the terminal controller modifies a display mode of the common game symbols, based on an input to the input terminal.

3. A game control method of a gaming machine including:

a plurality of gaming terminals each having a display that arranges a plurality of symbols, a symbol column image storage that stores a plurality of symbol column images having the plurality of symbols, and a terminal controller;

a center controller connected and in communication with the gaming terminals;

a terminal information memory which stores information output from any of the gaming terminals to the center controller, in association with identification information for identifying that gaming terminal; and, a common game symbol value storage which stores a common game symbol value table in which a plurality of common game symbols, that correspond to symbol column images only played in the common game, are associated with points that are weighed in advance, respectively, the method comprising the steps of:

(c1) the terminal controller repeatably running the unit game independently of the other gaming terminals, the unit game being a game in which the symbol column image scroll displayed is stopped to rearrange the plurality of symbols and determining a payout of each unit game in accordance with an arrangement of the rearranged symbols;

(c2) in response to a common game start command from the center controller, running a common game which executes in sync with the other gaming terminals a common scrolling process in which the symbols in the unit game are replaced with the common game symbols and the common game symbols are rearranged after the scrolling of the symbol column images is stopped;

(c3) determining which common game symbol is obtained among the common game symbols rearranged in (c2), and calculating, each time the common scrolling process is performed, a total sum of the points corresponding to the obtained common game symbols, with reference to the common game symbol value table stored in the common game symbol value storage; and (c4) outputting the identification information and the total sum of the points to the center controller, each time the common scrolling process is performed, (d1) the center controller outputting the common game start command to the terminal controller based on the state of the unit game run by the terminal controller;

(d2) accumulatively storing the total sum of the points output from the terminal controller in association with the identification information; and (d3) at a predetermining timing, determining a profit awarded to each of the gaming terminals, based on the total sum of the points accumulatively stored in the terminal information memory.

* * * * *